(12) United States Patent  (10) Patent No.: US 9,795,240 B2
Desjardin et al.  (45) Date of Patent: *Oct. 24, 2017

(54) PERSONAL JUICE EXTRACTOR SYSTEM

(71) Applicant: DESJARDIN, LLC, Union, KY (US)

(72) Inventors: Nathan Mark Desjardin, Columbia, MD (US); Matthew C. Desjardin, Union, KY (US)

(73) Assignee: DESJARDIN, LLC, Union, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/970,043

(22) Filed: Dec. 15, 2015

(65) Prior Publication Data

US 2016/0095461 A1  Apr. 7, 2016

Related U.S. Application Data

(63) Continuation-in-part of application No. 14/255,875, filed on Apr. 17, 2014, now Pat. No. 9,210,950.

(51) Int. Cl.
| *A47J 31/057* | (2006.01) |
| *A47J 31/00* | (2006.01) |
| *A47J 31/44* | (2006.01) |
| *B02C 15/00* | (2006.01) |
| *B04B 5/10* | (2006.01) |
| *A47J 19/02* | (2006.01) |
| *A23L 2/04* | (2006.01) |
| *A23N 1/02* | (2006.01) |

(Continued)

(52) U.S. Cl.
CPC ............... *A47J 19/02* (2013.01); *A23L 2/04* (2013.01); *A23N 1/02* (2013.01); *A23N 1/00* (2013.01); *A47J 31/005* (2013.01); *A47J 31/057* (2013.01); *A47J 31/20* (2013.01)

(58) Field of Classification Search
CPC ........ A47J 31/005; A47J 31/20; A47J 31/057; A47J 43/24; A47J 19/02; A47J 19/027; A21B 7/005; A01J 25/06; A23N 1/003; A23N 1/00; A23L 2/04; A22C 7/00; A23C 13/12
USPC ................. 99/279, 287, 304, 348, 456, 495, 99/501–503, 509–513; 426/489, 518, 519
See application file for complete search history.

(56) References Cited

U.S. PATENT DOCUMENTS

| 3,185,071 A * | 5/1965 | Foss ........................ A23N 1/003 100/116 |
| 4,345,517 A * | 8/1982 | Arao ...................... A47J 19/027 99/511 |
| 4,895,194 A | 1/1990 | McCann et al. |

(Continued)

*Primary Examiner* — Reginald L. Alexander
*Assistant Examiner* — Hemant Mathew
(74) *Attorney, Agent, or Firm* — Myers Wolin, LLC

(57) ABSTRACT

A personal juice extractor system is provided including a blending and pressing apparatus where a user places a container charged with food or beverage or any combination thereof in a container chamber. After the start button is pressed, a blending tool attached to a shaft along with a cover are lowered into the container until the cover seals the open top of the container. The blending tool is axially rotated until a desired consistency is achieved. The cover then presses down on the blended contents, forcing liquid to flow out an outlet in the bottom of the container and into an external cup for consumption. The cover, shaft, and blending tool are retracted and then the container is removed from the container chamber and discarded or cleaned for reuse.

6 Claims, 26 Drawing Sheets

(51) Int. Cl.
*A23N 1/00* (2006.01)
*A47J 31/20* (2006.01)

(56) References Cited

U.S. PATENT DOCUMENTS

| | | | |
|---|---|---|---|
| 5,348,393 A | | 9/1994 | Pappas, Jr. |
| 5,634,394 A | * | 6/1997 | Cortese ............... A47J 31/0684 99/287 |
| 6,135,019 A | * | 10/2000 | Chou ...................... A23N 1/00 366/205 |
| 6,223,652 B1 | | 5/2001 | Calia et al. |
| 6,616,323 B2 | | 9/2003 | McGill |
| 6,786,440 B2 | | 9/2004 | Ling et al. |
| 6,817,750 B1 | | 11/2004 | Sands |
| 7,063,456 B2 | | 6/2006 | Miller et al. |
| 7,066,640 B2 | | 6/2006 | Sands |
| 7,267,478 B2 | | 9/2007 | Miller et al. |
| 7,430,957 B2 | | 10/2008 | Sands |
| 9,210,950 B2 | * | 12/2015 | DesJardin ................ A23N 1/02 |
| 2004/0020369 A1 | * | 2/2004 | Long ..................... A47J 31/005 99/307 |
| 2009/0272280 A1 | * | 11/2009 | Cheung ................... A23N 1/02 99/513 |
| 2011/0028322 A1 | | 2/2011 | Sekino et al. |
| 2011/0041701 A1 | * | 2/2011 | Chatterjee ........... A47J 31/3642 99/295 |
| 2011/0076361 A1 | * | 3/2011 | Peterson ............ B65D 85/8043 426/79 |
| 2013/0344220 A1 | * | 12/2013 | Farrell .................... A47J 47/00 426/590 |
| 2013/0344221 A1 | * | 12/2013 | Farrell ..................... B01F 7/00 426/590 |

\* cited by examiner

PERSONAL JUICE EXTRACTOR SYSTEM

CROSS-REFERENCE TO RELATED APPLICATIONS

This application is a continuation in part of U.S. patent application Ser. No. 14/255,875, the contents of which are incorporated by reference herein.

FIELD OF THE INVENTION

The present disclosure relates to the field of domestic appliances, particularly the field of blenders, juice extractors or the like.

BACKGROUND

Juice extractors have become increasingly popular over the years. These devices extract juice from fresh fruits and/or vegetables and provide people with fresh, healthy, and all natural beverages. In a fast-paced world, there is an increasing demand for healthy beverages that can be prepared easily, quickly, and most importantly with minimal cleanup. Furthermore, people would greatly benefit from a properly portioned, fresh beverage from the comfort of their own home.

While numerous health benefits are associated with juicing, the extraction process is often known to be time-intensive, difficult, and messy. Typically, a user must: gather necessary fruit and/or vegetables, wash and cut the food to proper size, insert all food into the extractor, dispose of the organic waste, disassemble and clean the extractor parts, and lastly reassemble the extractor. Thus, many users are left frustrated and demanding a better option. Moreover, a correct portion size is not easily enforced due to no standard amount of fruit and/or vegetables allowed to be juiced during a single session. It is also known that devices have been made that simply blend fruit and/or vegetables into a pulp and provide both the pulp and juice mixed together for consumption. However, many people prefer a beverage containing little to no pulp. For the foregoing reasons, there is a need for a machine that can produce personal juice beverages from fresh fruit and/or vegetables.

SUMMARY

The present disclosure is directed to a personal blender and juicer system that meets these needs.

It is an aspect of the disclosure to provide a food blending and pressing apparatus. The food blending and pressing apparatus includes a housing that covers moving machinery used for blending and pressing food and/or beverage in a removable container located in a container chamber. The upper face of the bottom of the container chamber preferably includes an anti-rotational surface so that when the container with a preferably complimentary anti-rotational bottom surface is inserted into the container chamber, the container is secured. A start button is preferably pressed by a user to initiate the automatic blending and pressing process. A blending tool is rotated by a driving source which blends food and/or beverage in the container to a desired consistency while a cover hermetically seals the container during the blending process. A primary elevator assembly is used to raise and lower a shaft attached to the blending tool during the blending process. The primary elevator is preferably driven by a spring-loaded lever. A secondary elevator assembly is used to raise and lower the cover during the blending and pressing. The secondary elevator is preferably driven by an inflatable and deflatable airbag. Once the blending process is complete, the cover is used to press the food and/or beverage towards the bottom of the container causing liquid to flow through an outlet in the container. The shaft is preferably connected to the driving source as well as to the secondary elevator by quick release connectors for quick removal and cleaning. The cover is preferably connected to the secondary elevator by a quick release connector for quick removal and cleaning.

Furthermore, it is another aspect of the disclosure to provide a container. The preferably cylindrical container has an upper opening to afford food and/or beverage, a blending tool and a cover. The top diameter of the container is preferably larger than that of the bottom diameter to allow for efficient stacking and a funnel is preferably connected to the top of the container to allow the cover to properly seal upon entering the upper opening of the container. The sides of the container preferably have vertical concave grooves extending half-way down to allow pressure to escape when the cover is inserted into the container. A spacer may be mounted at the center of the upper face of the bottom of the container to prevent the blending tool from contacting the bottom of the container during operation. The container preferably includes an anti-rotational surface on the bottom so that when inserted into a food blending and pressing apparatus with a complementary anti-rotational surface, the container is properly secured. The container is removably inserted into a food blending and pressing apparatus. Food and/or beverage is first blended and then pressed in the container, forcing liquid to flow through an outlet fitted with a filter in the bottom of the container into an external cup. The outlet is preferably connected to a secondary outlet extending out to a spout, thereby allowing liquid to be received in the external cup placed adjacent to the container. The outlet is preferably covered by a valve that prevents liquid from passing out of the container due to gravity. Furthermore the outlet and open top are preferably covered with a plastic film to prevent contamination prior to use.

It is another aspect of the disclosure to provide a method of blending and pressing food and/or beverage in a container wherein food and/or beverage is placed on a container, the container is secured in a container chamber, a shaft with a blending tool is lowered into the container while a cover is also lowered into the container to seal the container, the shaft and the blending tool are rotated by a driving source thereby blending the food and/or beverage, the shaft and the blending tool are moved up and down as necessary until a desire consistency is met, the cover is lowered further into the container thereby forcing liquid through an outlet in the container and into an external cup, followed by the cover, shaft, and blending tool being retracted, and then removing the container from the chamber. The cover and blending tool may be removed for cleaning.

These and other features, aspects, and advantages of the present disclosure will become better understood with reference to the following description and claims.

BRIEF DESCRIPTION OF THE DRAWINGS

The disclosure is generally shown by way of reference to the accompanying drawings in which.

DETAILED DESCRIPTION OF THE PREFERRED EMBODIMENTS

Figure 1:
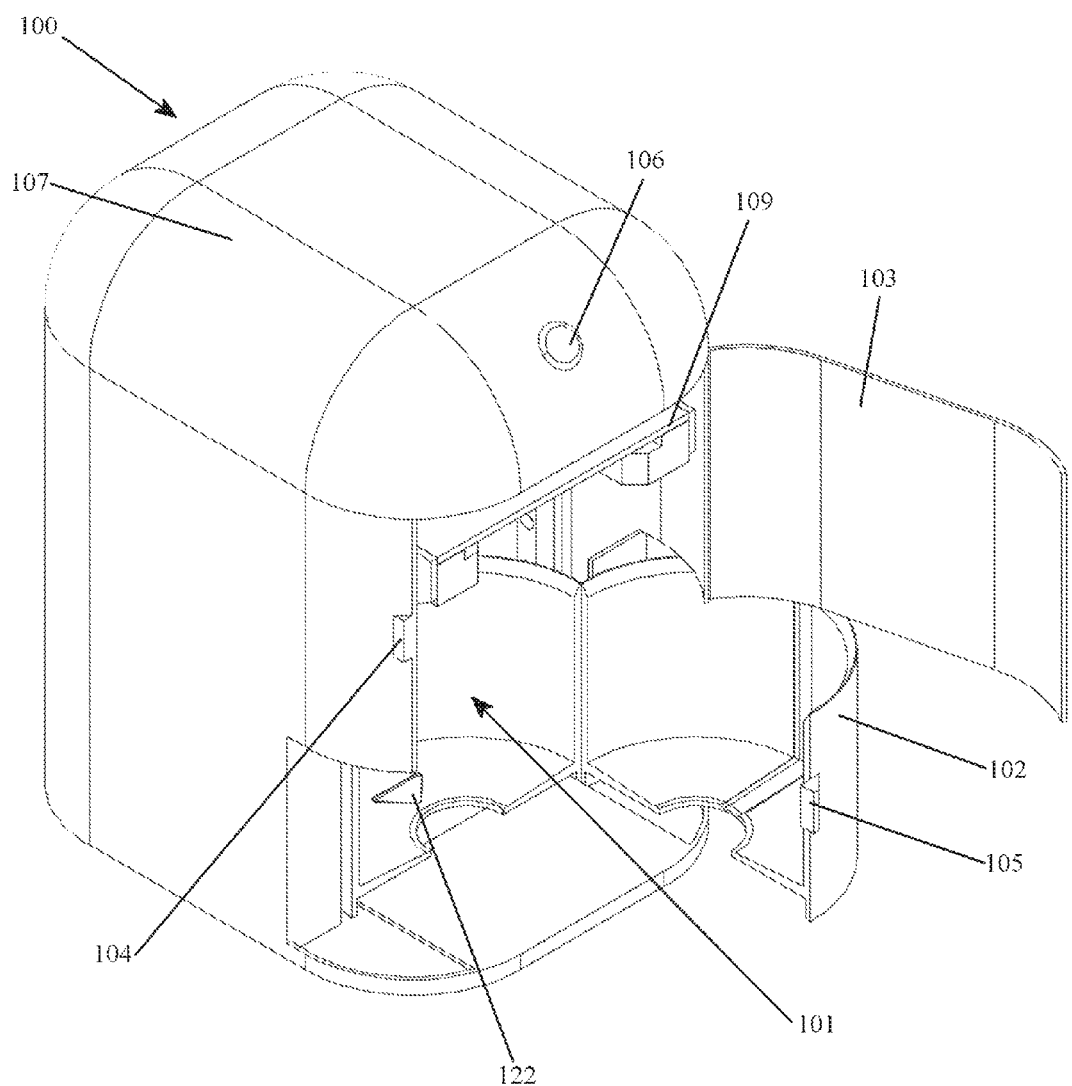
FIG. 1 is a perspective view of one embodiment of a food blending and pressing apparatus with both primary and secondary doors open, the container chamber empty, and the blending tool and cover removed.

Referring to the drawings, FIGS. 1-4 generally depict a food blending and pressing apparatus 100 comprising a removable container 200 with an open top 201 received in a container chamber 101, a cover 111 used for both sealing open top 201 and pressing the contents in container 200, and a blending tool 112 used for chopping, mixing, or liquefying food in container 200.

Figure 7:
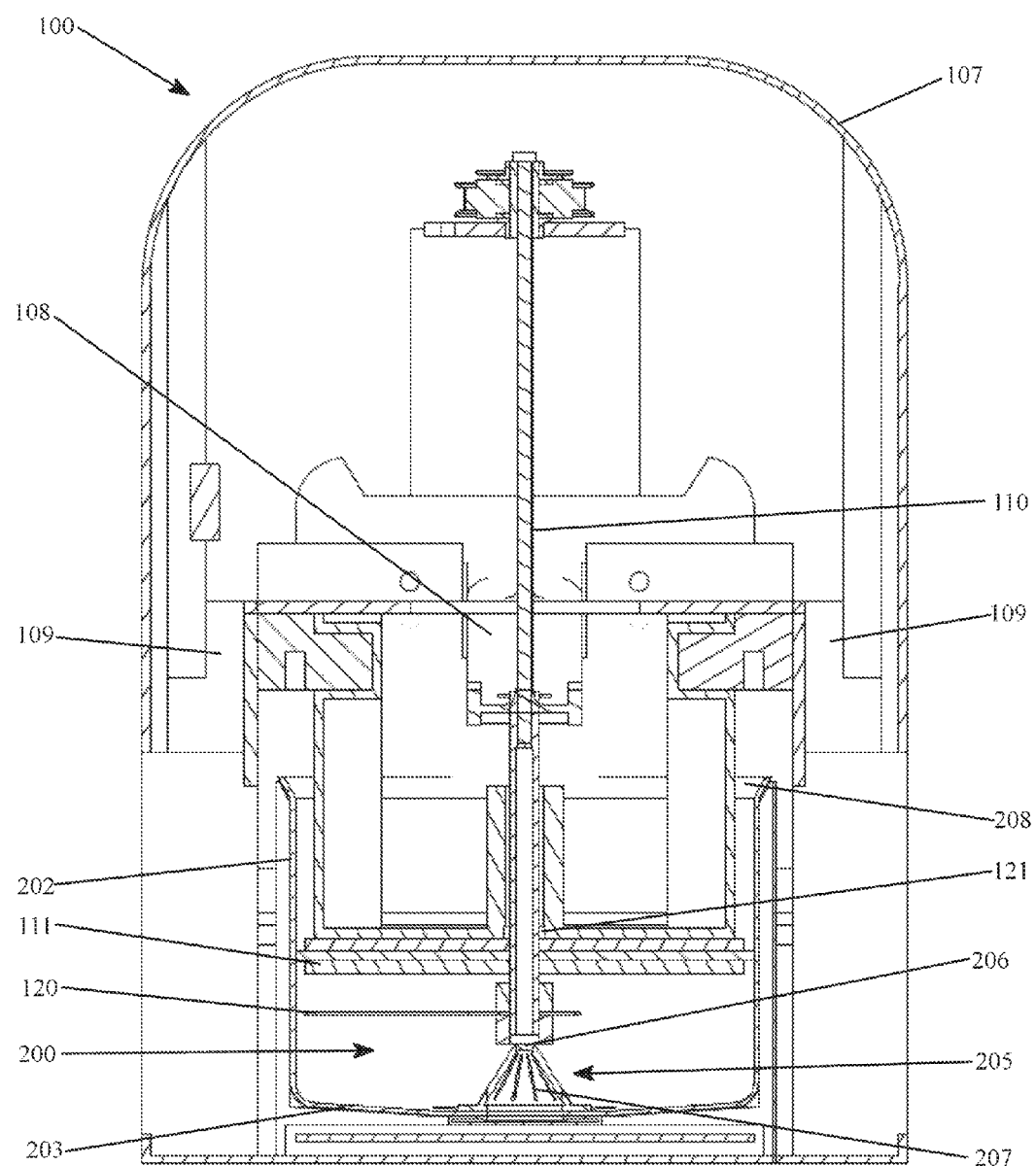
FIG. 7 is a frontal cross sectional view similar to FIG. 6 showing the blending tool and cover extended downward wherein the blending tool contacts the spacer.
Figure 11:
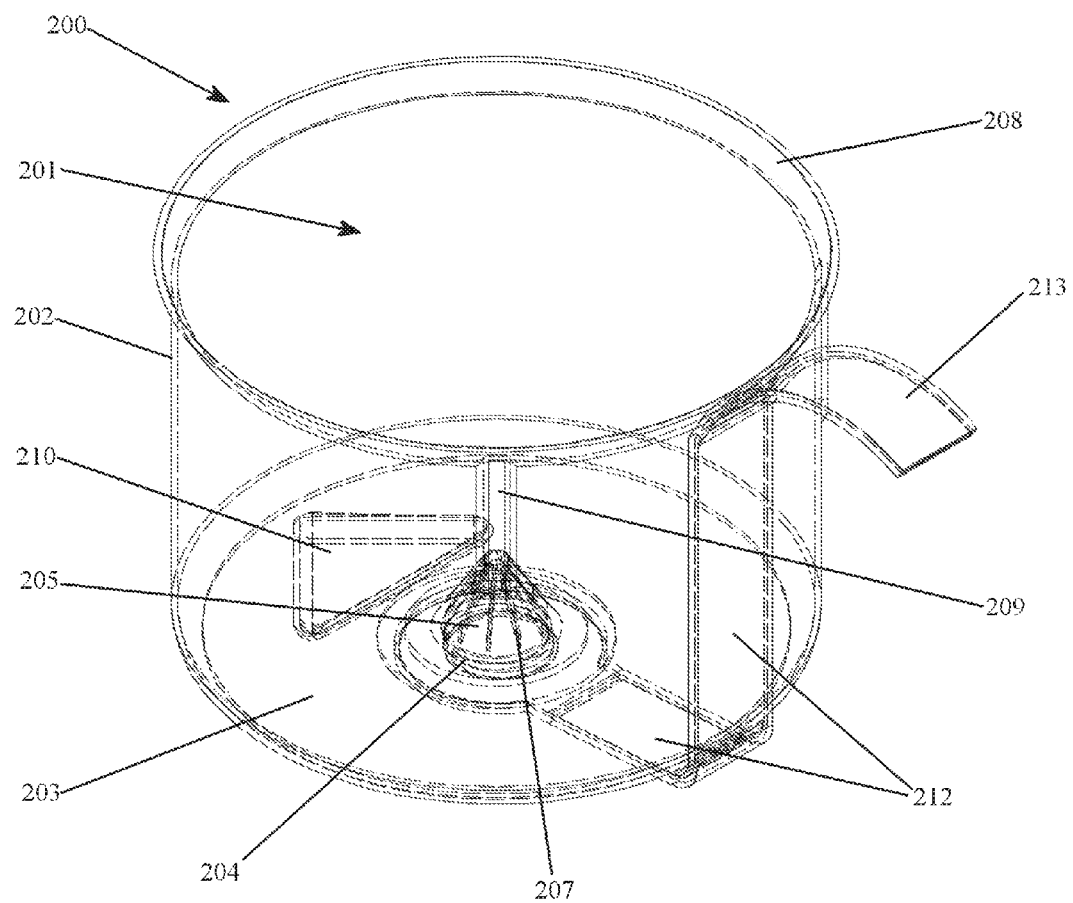
FIG. 11 is a perspective view of one embodiment of a container in accordance with the present disclosure.

FIG. 11 provides a view of one embodiment of container 200. Container 200 further comprises sides 202 which may be generally cylindrical and a bottom 203. For example, container 200 is constructed to hold food and/or beverage before, during, and after the blending and pressing process. An outlet 204 is mounted through bottom 203 to allow liquid to flow out of container 200 when pressurized. Outlet 204 has a filter 207 which provides a sieve-like configuration to prevent solids from flowing out of container 200 during the blending and pressing process. A spacer 205 may be mounted on the upper surface of bottom 203. As shown in FIG. 7, spacer 205 prevents blending tool 112 from hitting and thus damaging bottom 203 during operation. The upper face of spacer 205 is a bearing surface 206 and therefore allows blending tool 112 to spin freely while contacting bearing surface 206.

In one example of container 200, all parts of container 200 are manufactured with non-hazardous materials conforming to international food safety standards. The materials used to construct it may be such that container 200 is discarded after a single use. Likewise, in another example, the materials used to construct container 200 may be such that it is reusable after cleaning by increasing the thickness and strength of such materials.

Figure 10:
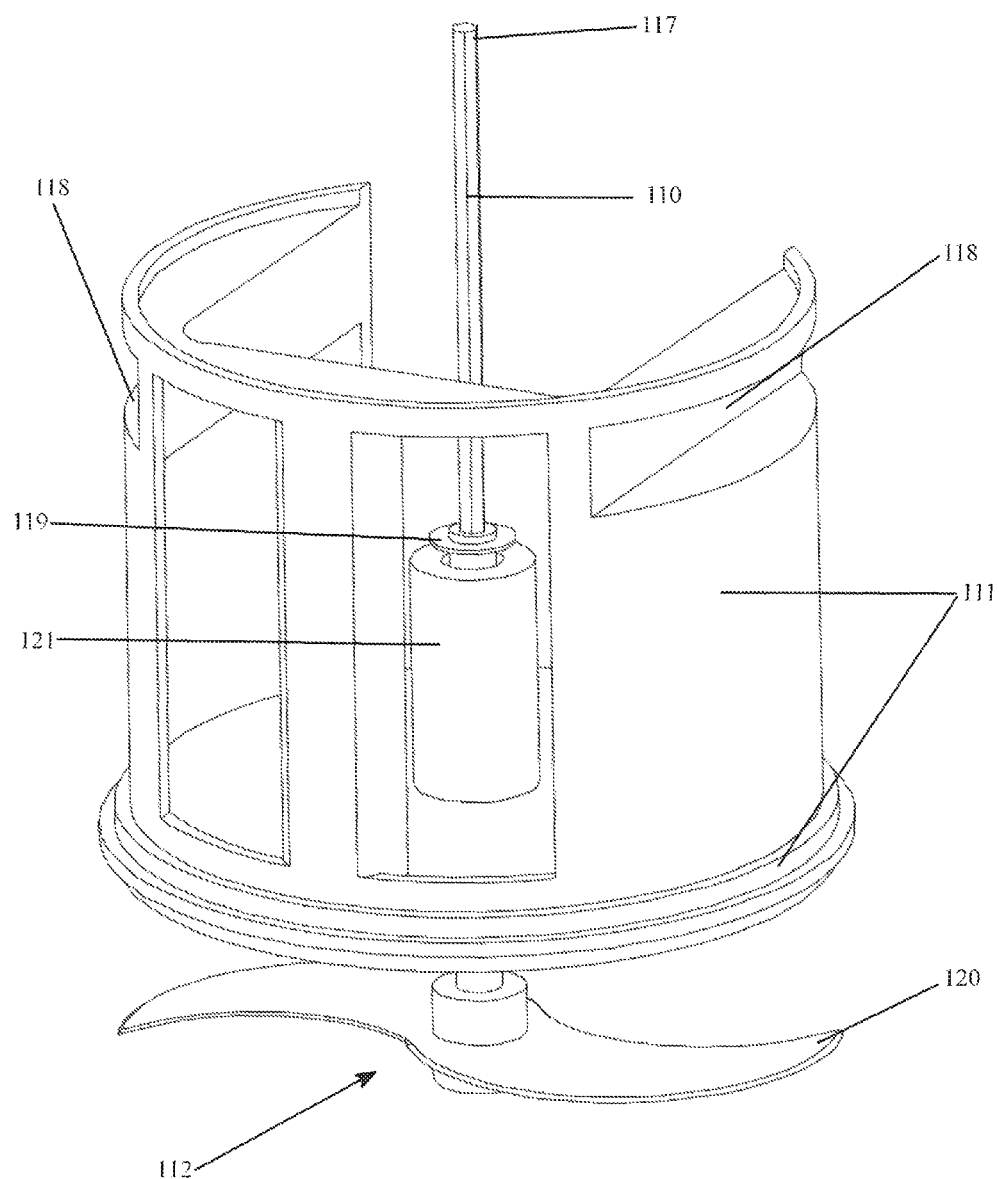
FIG. 10 is a perspective view of the blending tool and cover assembly of the blending and pressing apparatus shown in FIG. 2.

FIG. 10 illustrates one embodiment of cover 111. Cover 111 is used to hermetically seal open top 201 of container 200 and also to press food and/or beverage toward bottom 203 forcing liquid to flow out through outlet 204. For example, a secondary elevator assembly 109 is attached to cover 111 (FIGS. 5-7) to provide the means to vertically reciprocate cover 111 up and down as needed during the blending and pressing process. The reciprocating motion of secondary elevator assembly 109 may be driven by deflating and inflating an airbag apparatus 116. A releasable connector 118 may be integrated into cover 111 to allow cover 111 to be removed for cleaning (FIG. 10).

Figure 5:
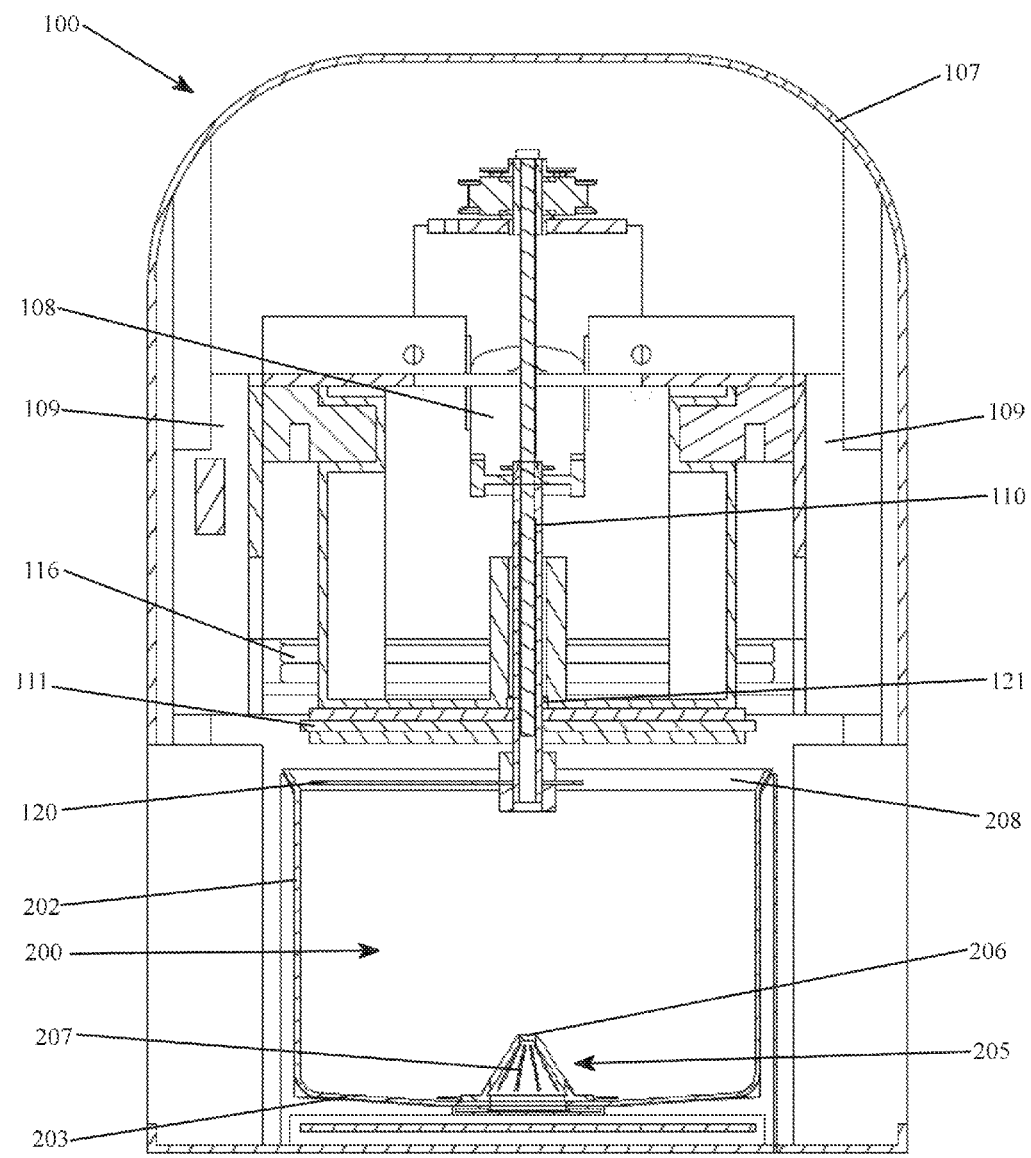
FIG. 5 is a frontal cross sectional view of the food blending and pressing apparatus of FIG. 3 showing the blending tool and cover fully retracted.
Figure 6:
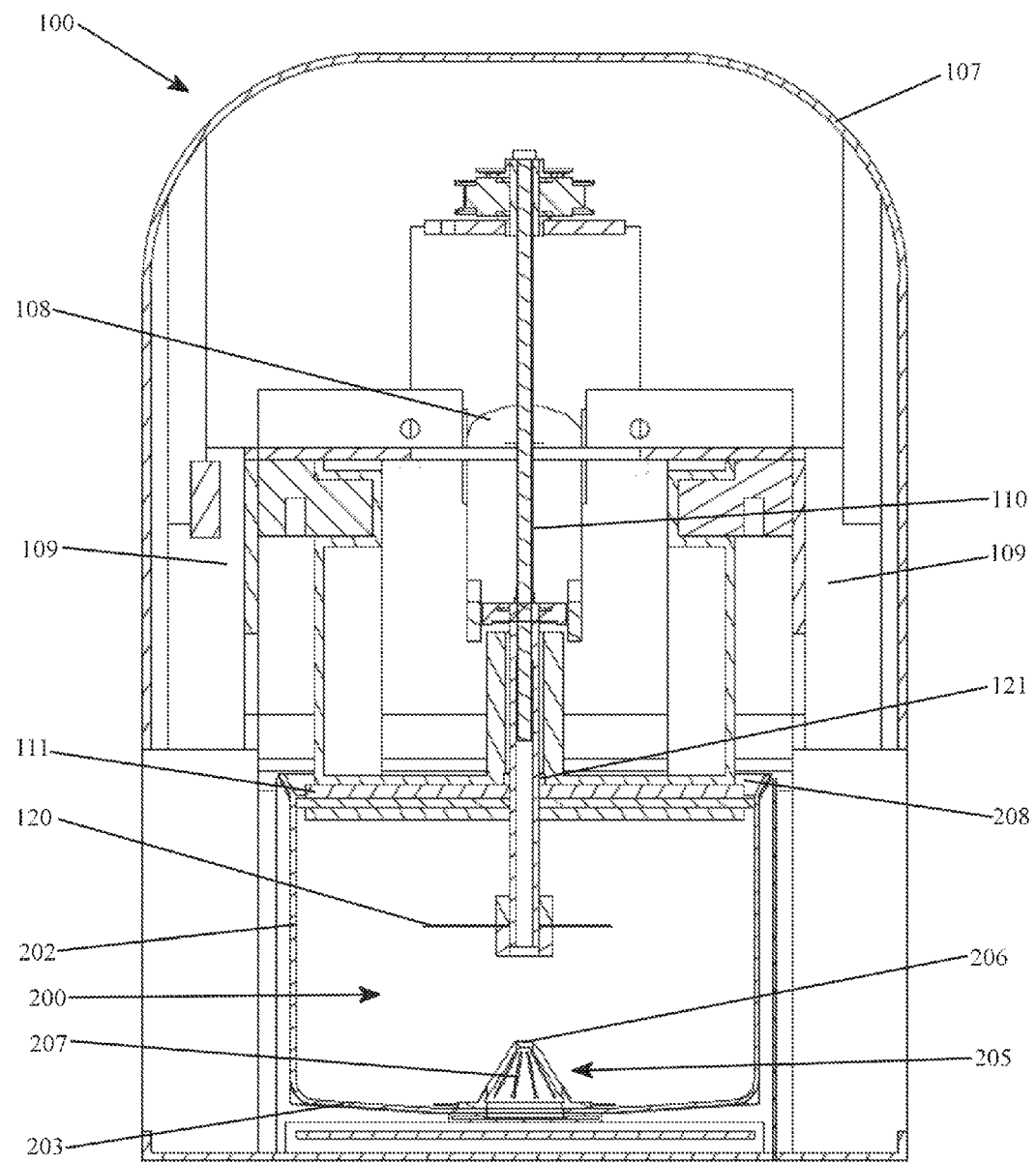
FIG. 6 is a frontal cross sectional view similar to FIG. 5 showing the blending tool and cover are partially extended downward wherein the cover contacts the container.
Figure 8:
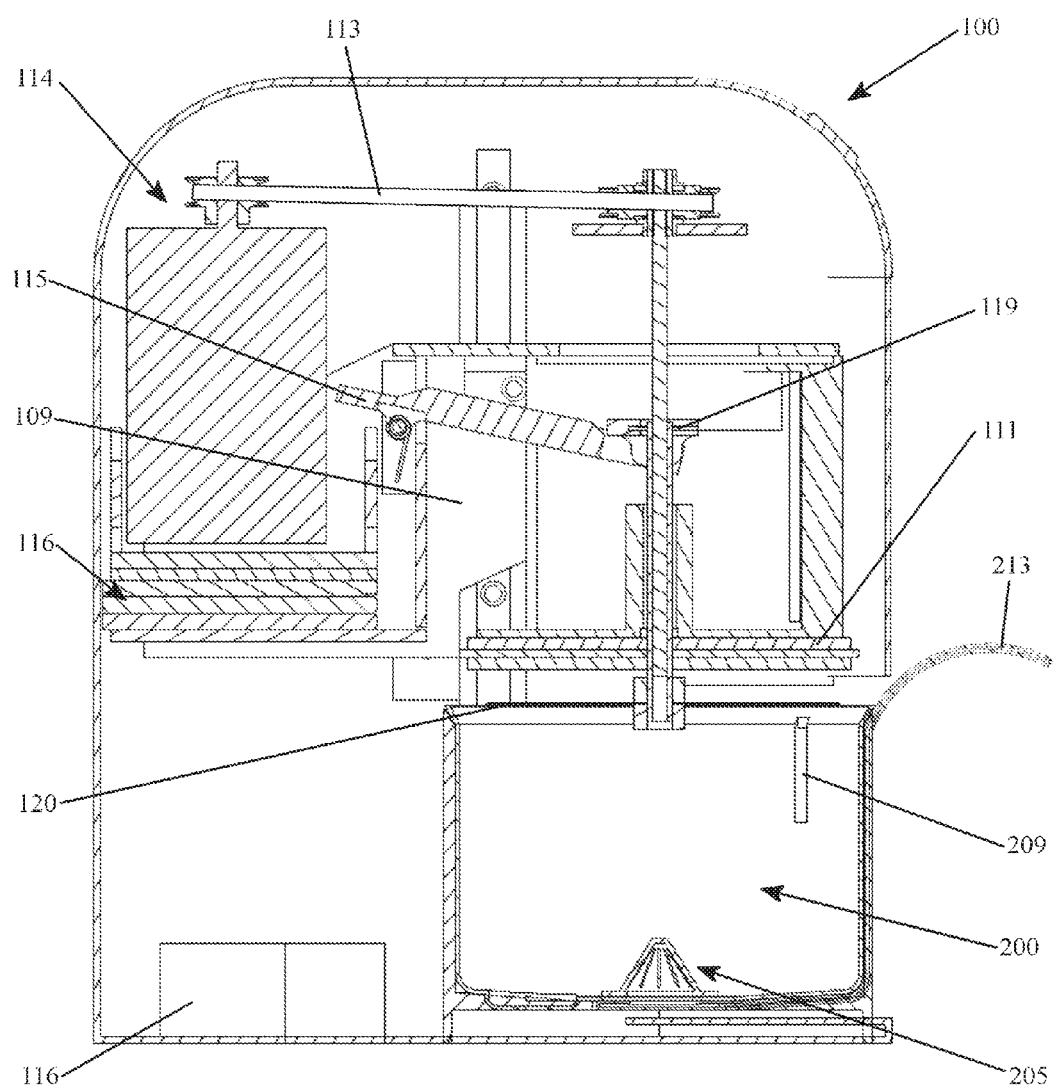
FIG. 8 is a side cross sectional view of the food blending and pressing apparatus of FIG. 5 showing the airbag apparatus deflated.
Figure 9:
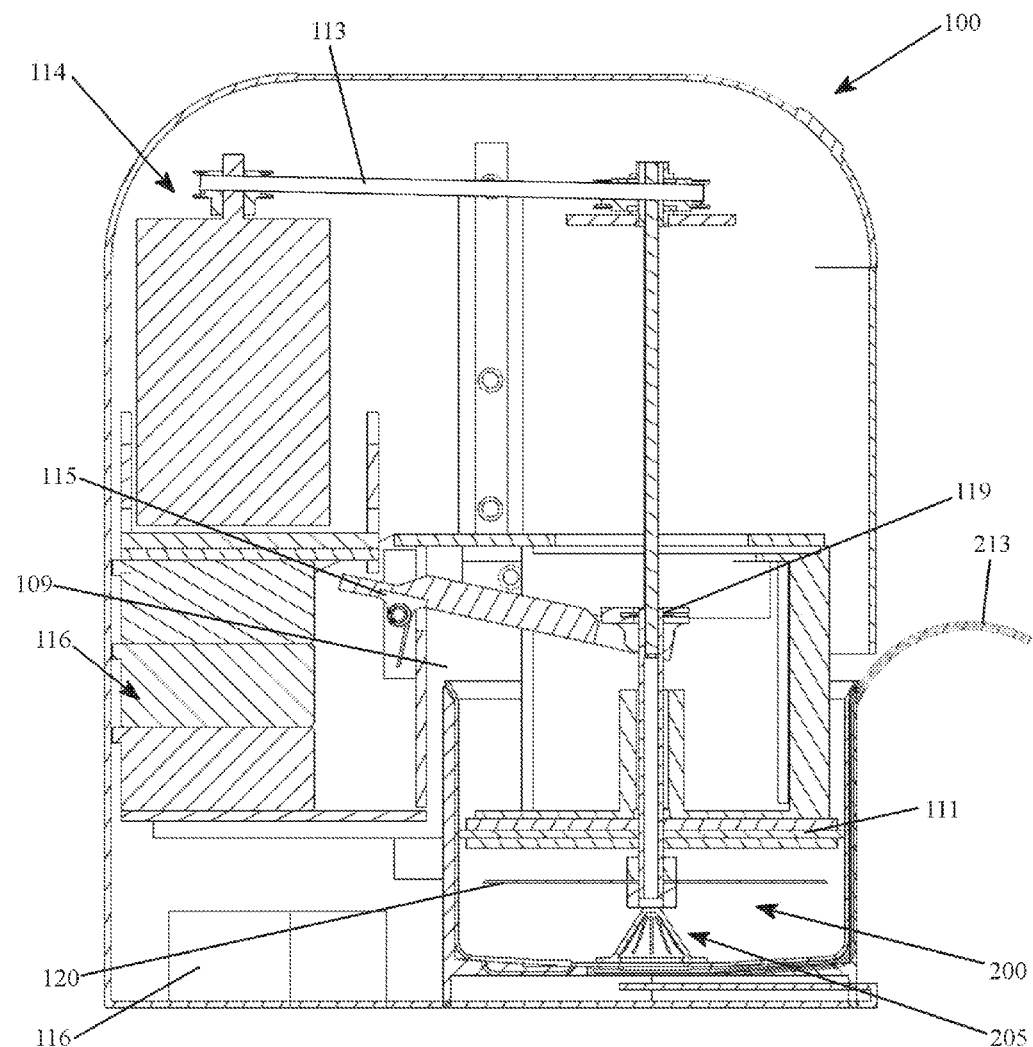
FIG. 9 is a side cross sectional view of the food blending and pressing apparatus of FIG. 7 showing the airbag inflated.

FIG. 10 also illustrates one embodiment of blending tool 112. Blending tool 112 is attached to the bottom end of a shaft 110. Shaft 110 is extended through the center of cover 111 and includes a connector 117 on the top end of shaft 110 that is connected to a driving source 114 using a belt 113 to rotate blending tool 112. In the preferred embodiment, connector 117 has a hex shaped cross-section and is integrated into shaft 110. A sanitary seal 121 is attached to cover 111, hermetically sealing cover 111 about shaft 110 thereby preventing air, liquid, or solids escaping from container 200 (FIG. 7). A primary elevator assembly 108 is attached to shaft 110 to provide the means to vertically reciprocate blending tool 112 up and down as needed during the blending and pressing process (FIGS. 5-7). The reciprocating motion of primary elevator assembly 108 may be driven by a spring-load lever 115 (FIGS. 8-9). Connectors 117 and 119 may be releasable to allow blending tool 112 and shaft 110 to be removed for cleaning. Blending tool 112 may include radially extended cutting blades 120 with sharpened edges, pointed tips, and one or more bends along the surface of the cutting elements.

Figure 2:
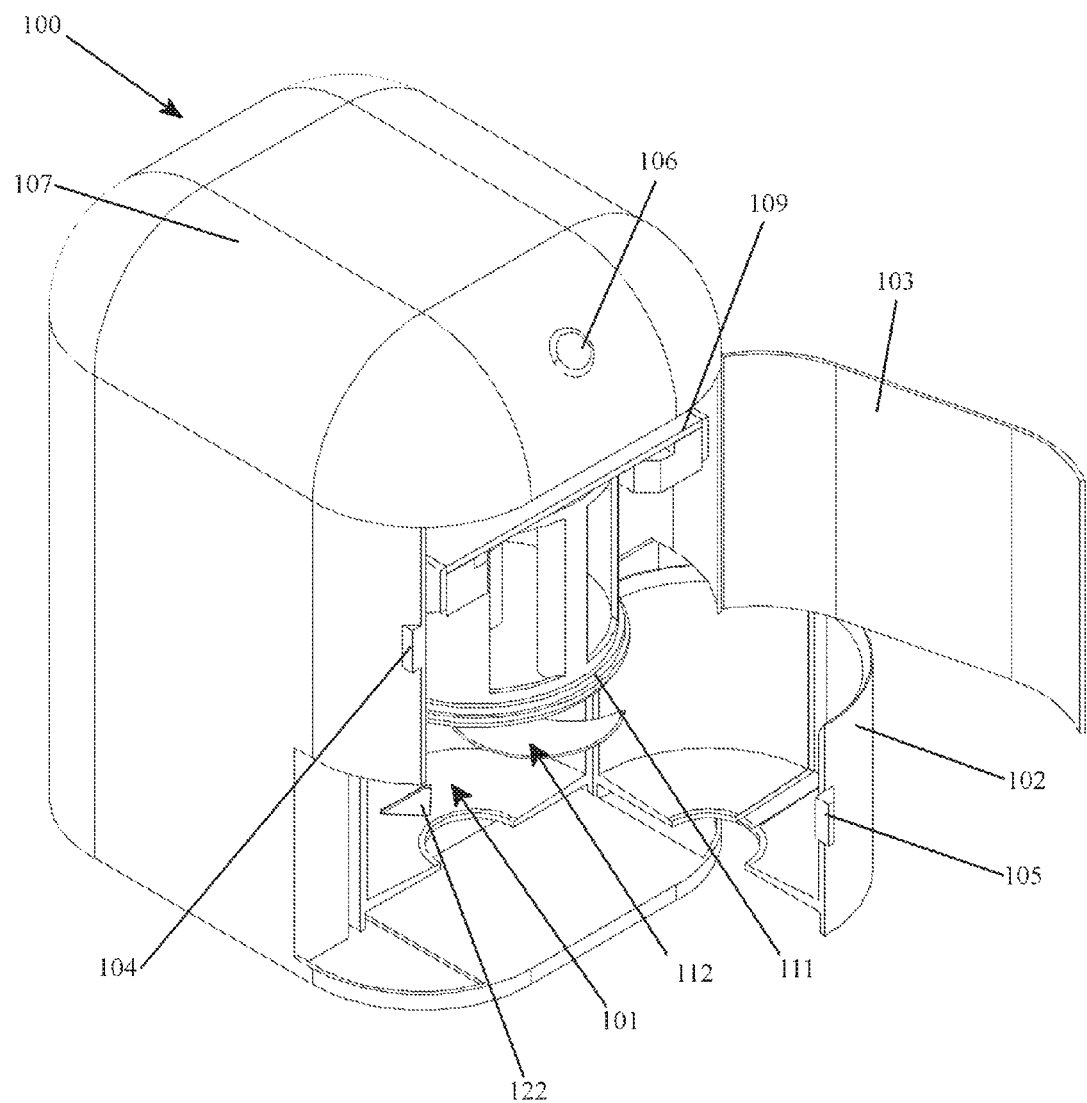
FIG. 2 is a perspective view similar to FIG. 1 with the blending tool and cover inserted.
Figure 3:
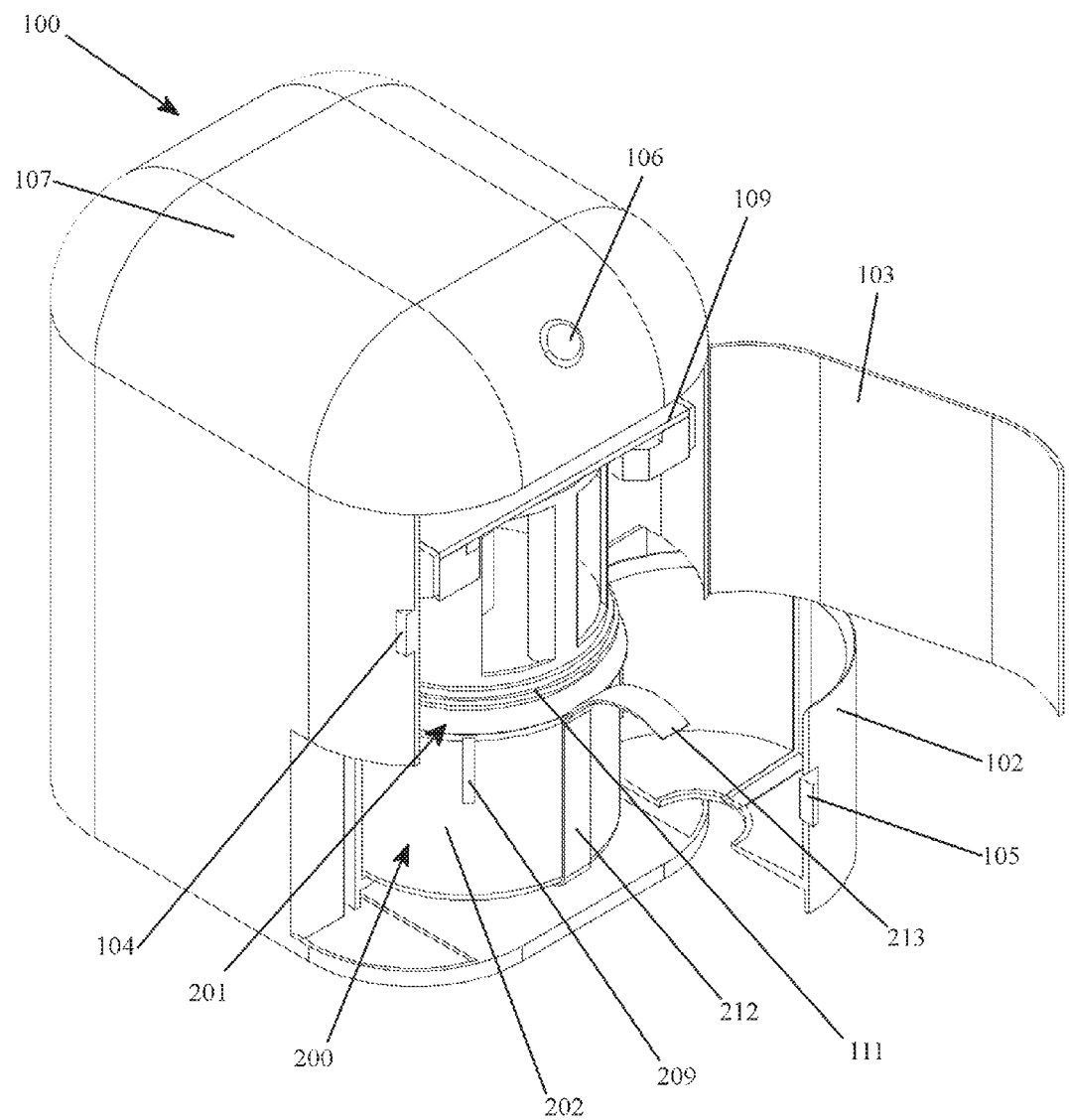
FIG. 3 is a perspective view similar to FIG. 2 with the container inserted in the container chamber.
Figure 4:
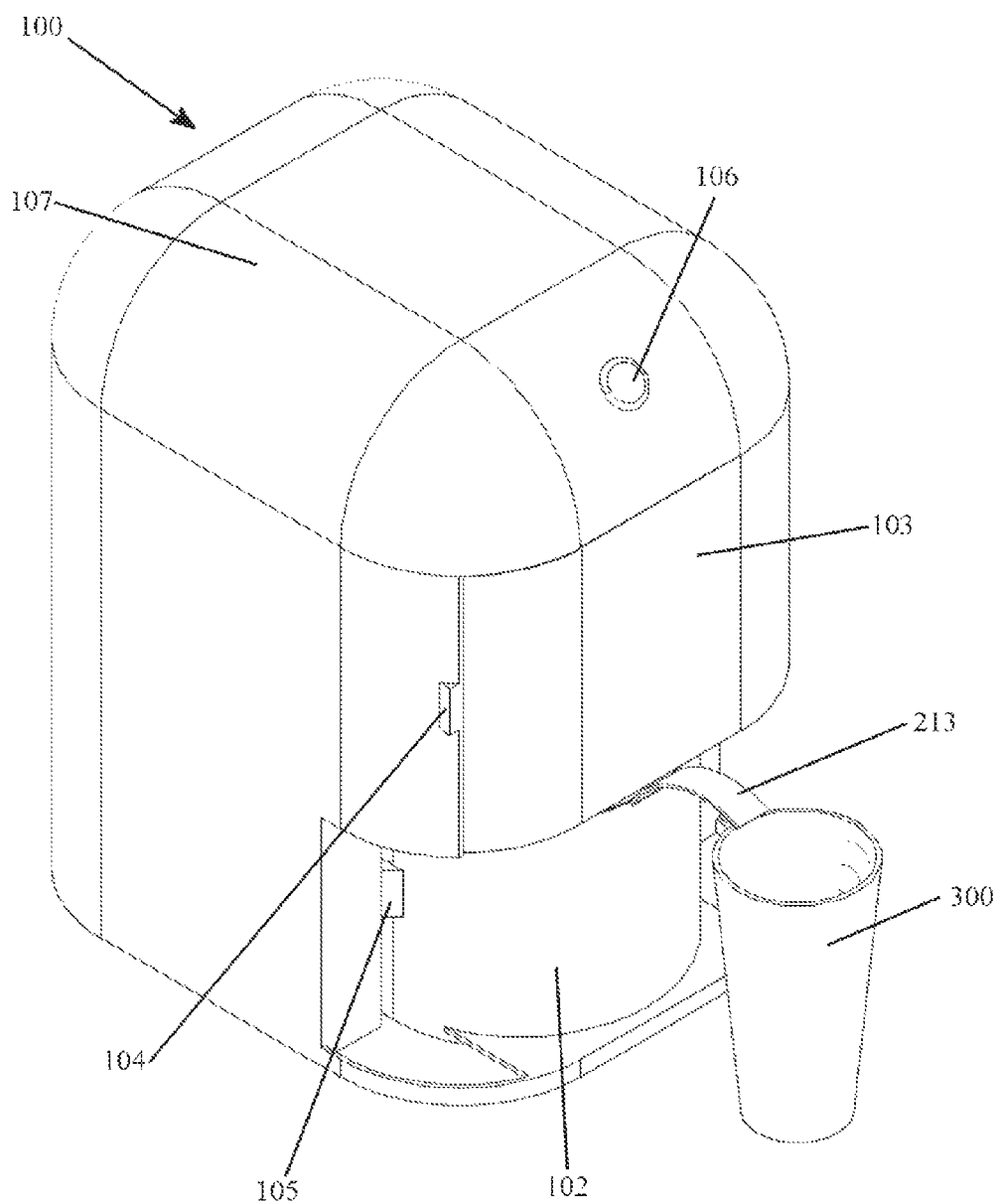
FIG. 4 is a perspective view similar to FIG. 3 with both primary and secondary doors closed and an external cup placed next to the food blending and pressing apparatus.
Figure 12A:
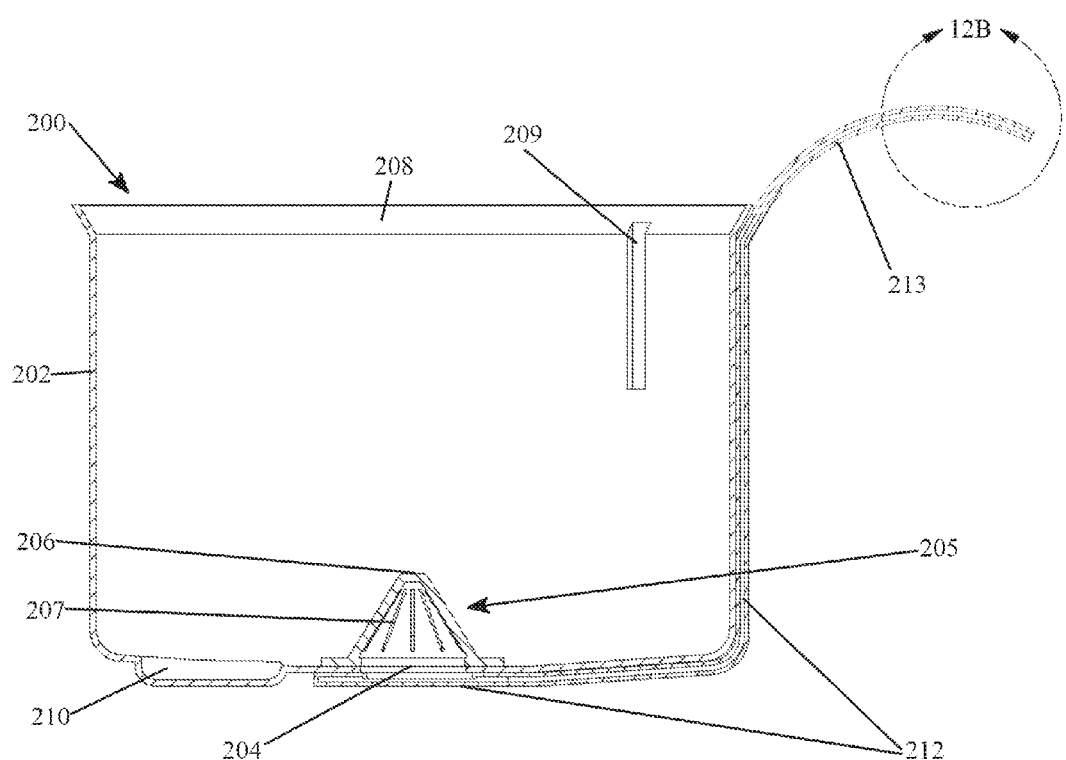
FIG. 12A is a side cross sectional view of the container shown in FIG. 11.
Figure 12B:
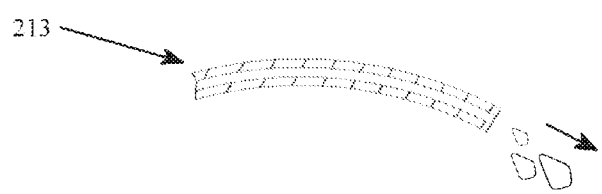
FIG. 12B is an enlarged side cross sectional view of the spout shown in FIG. 12A with liquid exiting the spout.
Figure 13:
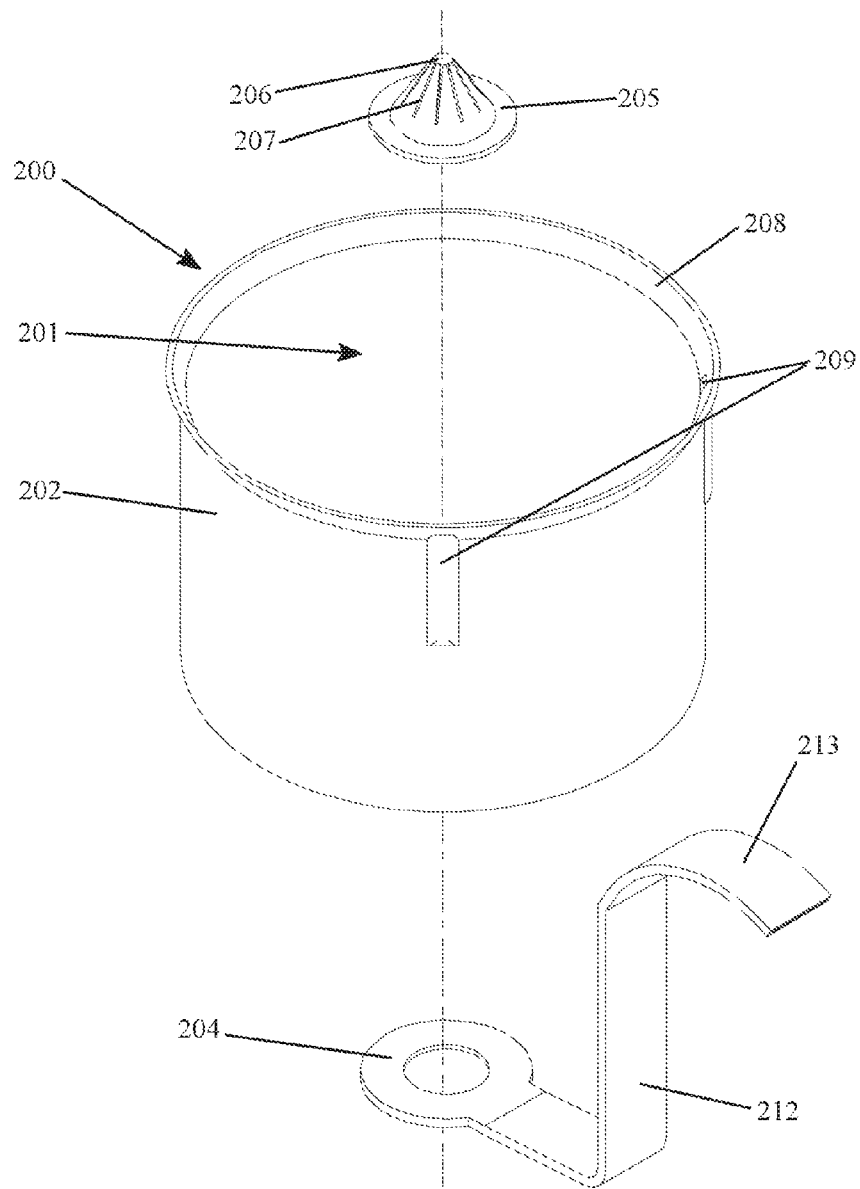
FIG. 13 is an exploded view of the container shown in FIG. 11.

FIGS. 1-4 generally illustrate the process of installing components into food blending and pressing apparatus 100. FIG. 1 shows a housing 107 used to protect the components. A primary door 103 and latch 104 may be opened to provide access to blending tool 112 and cover 111 (FIG. 2). A secondary door 102 and latch 105 may be opened to provide access to container chamber 101. Blending tool 112 and cover 111 are inserted into food blending and pressing apparatus 100 as shown in FIG. 2. Container 200 is charged with food and inserted into food blending and pressing apparatus 100 as shown in FIG. 3. FIG. 4 shows one embodiment where primary door 103 and secondary door 102 are closed and an external cup 300 next to food blending and pressing apparatus 100. During the food blending and pressing process, juice may be extracted out through spout 213 into external cup 300 for consumption (FIGS. 12A-12B). Spout 213 may be connected to a secondary outlet 212 which may be connected to outlet 204.

Figure 17:
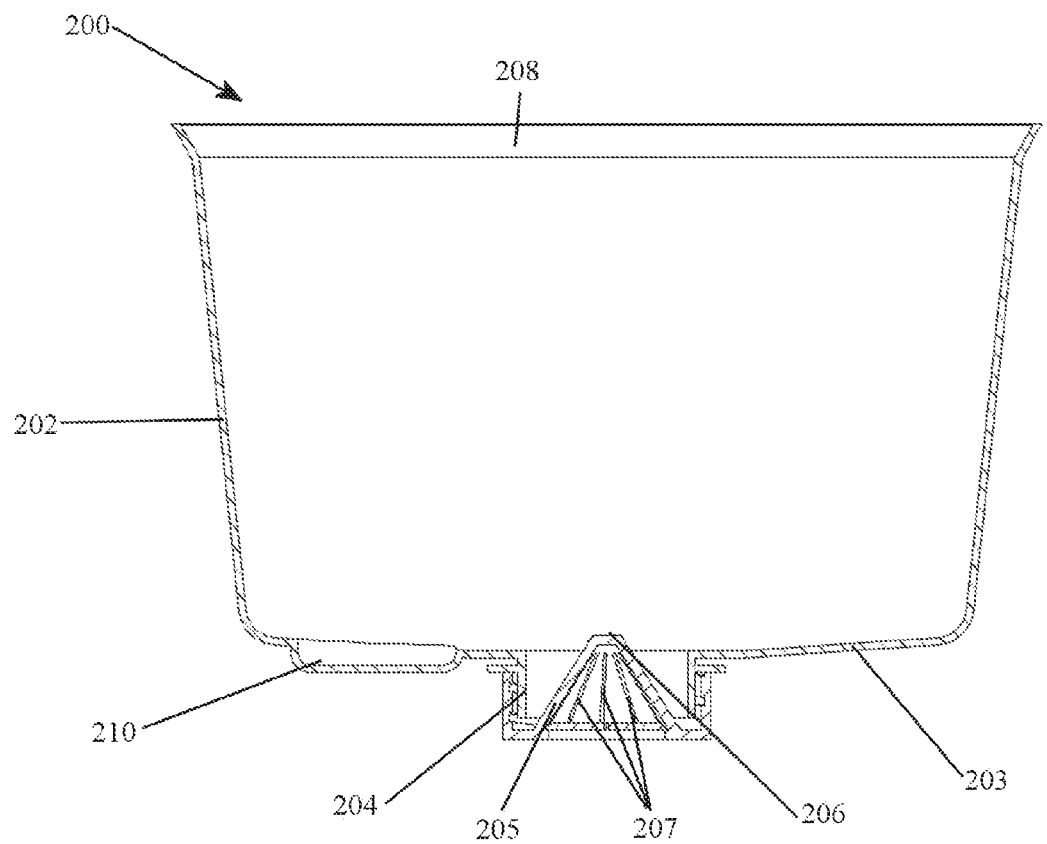
FIG. 17 is a perspective view of another embodiment of a container in accordance with the present disclosure, the sides are angled such that the containers are stackable.

Sides 202 of container 200 may be constructed in an inverted frustoconical shape such that the diameter of open top 201 is larger than the diameter of bottom 203 (FIG. 17). This allows container 200 to be stacked in another container 200 efficiently when empty. Container 200 may include a funnel 208 attached to open top 201 thereby correcting small misalignments when cover 111 is lowered into container 200. Container 200 may include one or more vertical pressure relief grooves 209 (FIG. 11) which allows pressure to escape container 200 until cover 111 is lowered below the bottom of pressure relief grooves 209. This allows cover 111 and blending tool 112 to be lowered into container 200 without forcing liquid through outlet 204. Also, a valve 211 may cover outlet 204 to prevent liquid from flowing out of container 200 until pressure is applied inside container 200, forcing liquid through outlet 204 (FIG. 15).

Figure 14:
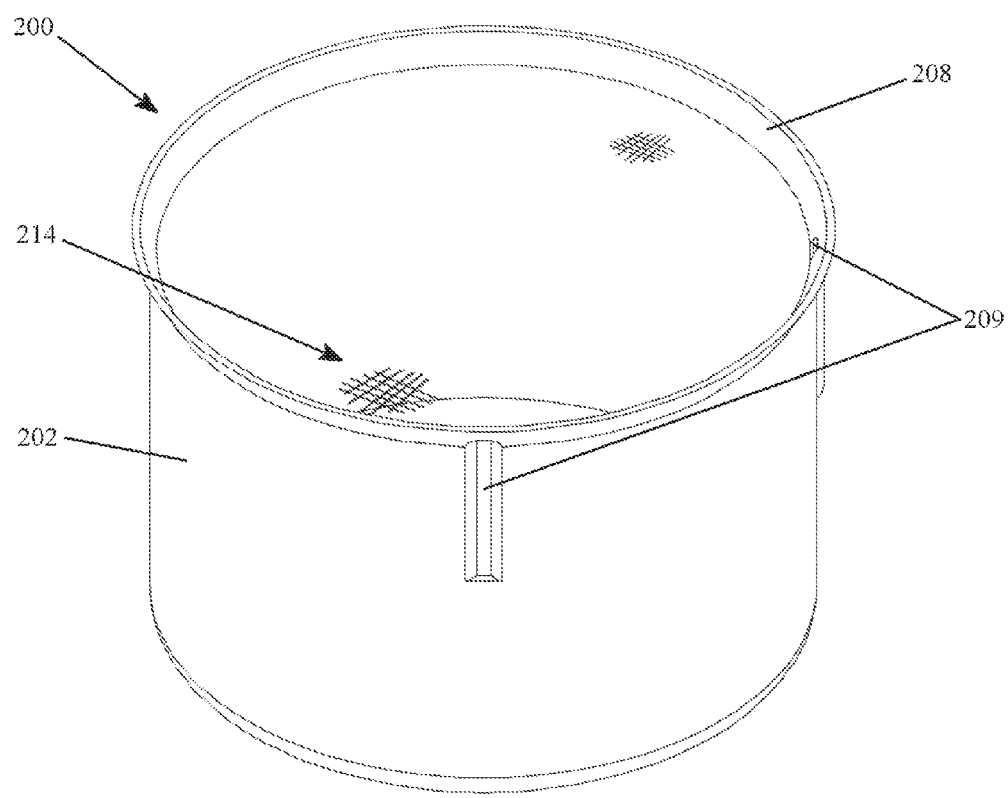
FIG. 14 is a perspective view of another embodiment of a container in accordance with the present disclosure, a plastic film is shown covering the open top.
Figure 15:
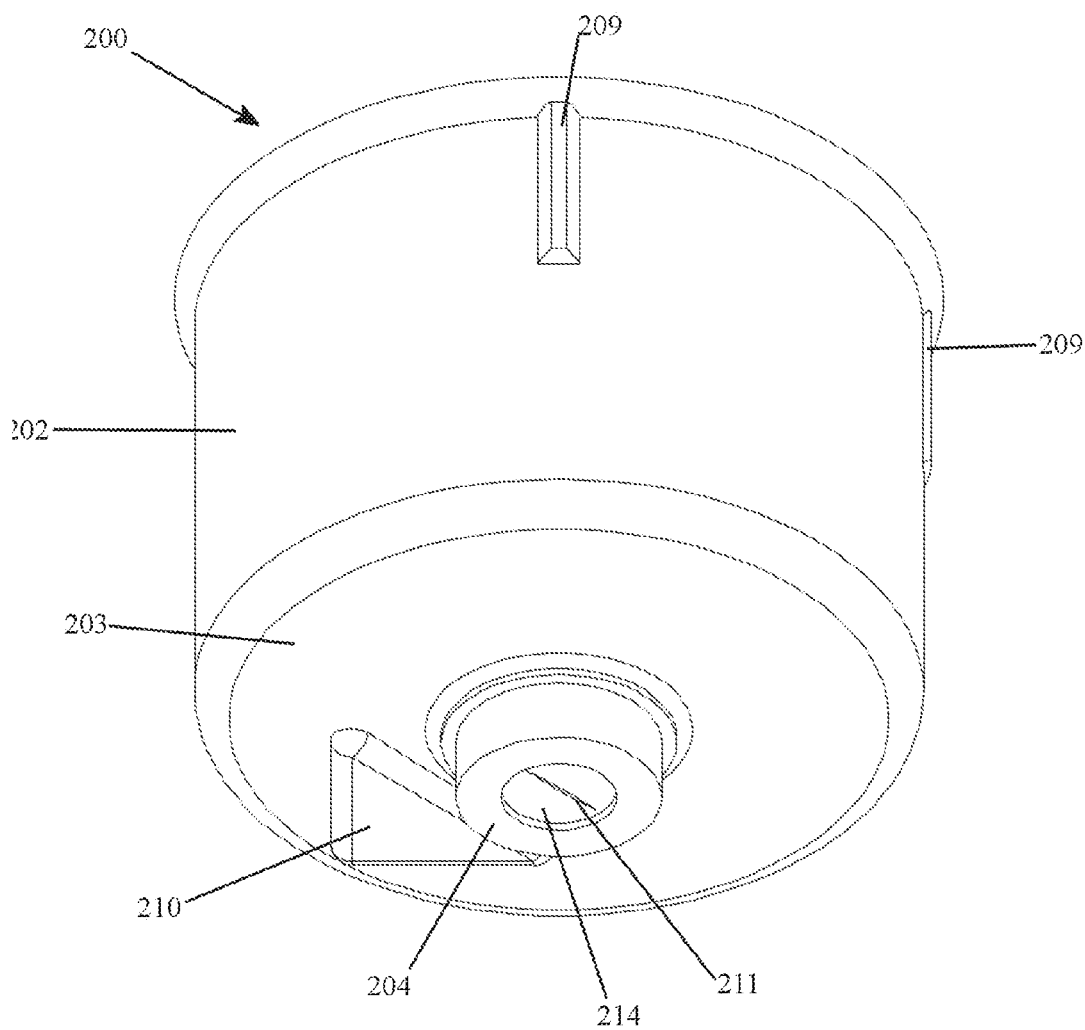
FIG. 15 is a perspective view of the bottom of the container shown in FIG. 14.

Bottom 203 may include an anti-rotational surface 210 in the shape of a downwardly protruding triangular-shaped vane (FIG. 15). Anti-rotational surface 210 is complementary to a concavely shaped anti-rotational surface 122 located in the bottom of container chamber 101 (FIG. 1) and such that when container 200 is inserted in container chamber 101, container 200 is unable to rotate. A plastic film 214 may be fixed to both open top 201 (FIG. 14) and outlet 204 (FIG. 15) of container 200 to prevent contamination prior to use.

Figure 16:
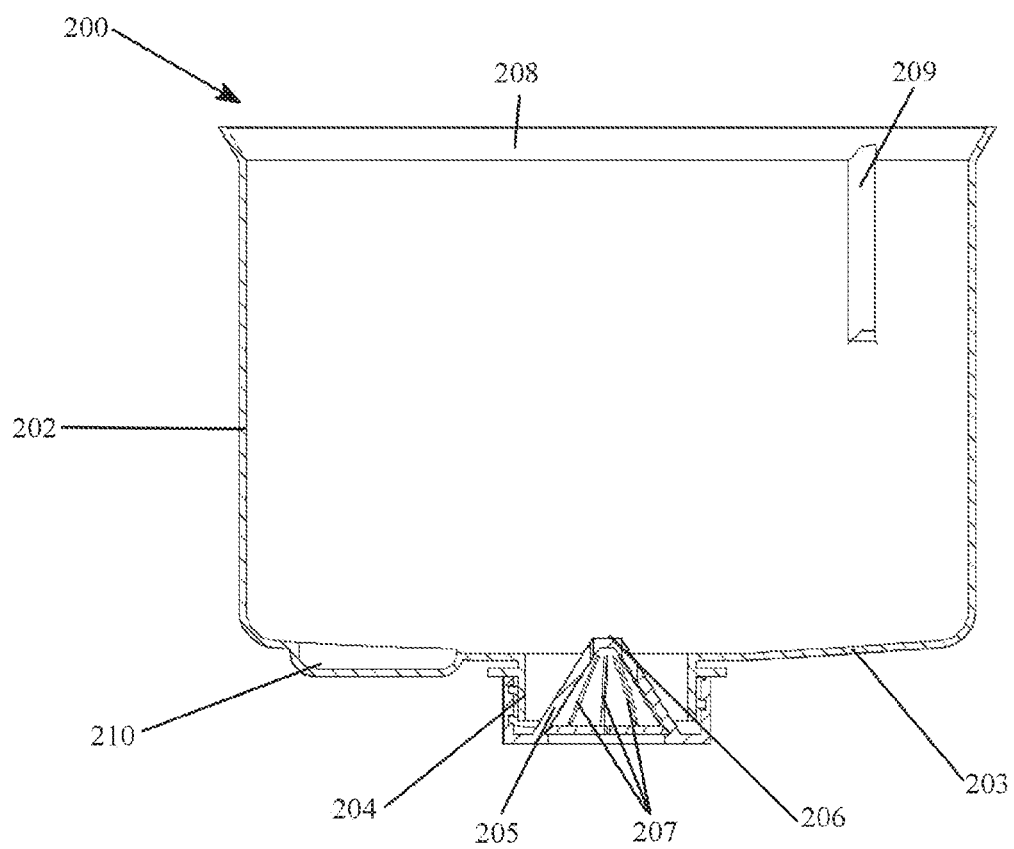
FIG. 16 is a cross sectional view of the container shown in FIG. 14.

FIGS. 14-16 generally illustrate an alternative configuration to container 200. No spout 213 or secondary outlet 212 are used. Outlet 204 may allow liquid to flow out of container 200 into an external cup (not shown) directly below container 200.

In the preferred embodiment, container 200 is filled with food and/or beverage and then placed in container chamber 101. A start button 106 is pressed by the user to initiate the blending and pressing process. The blending and pressing process begins by lowering shaft 110 along with attached blending tool 112 into container 200 while also lowering cover 111 into container 200 until cover 111 contacts container 200, thereby sealing open top 201. The food and/or beverage is blended by rotating shaft 110 and blending tool 112 using driving source 114. Shaft 110 and blending tool 112 are lowered and raised as necessary while rotating in order to properly blend the contents and then rotation is halted once a preferred consistency is met. Cover 111 is then lowered further into container 200, pressing food and/or beverage towards bottom 203 and forcing liquid through outlet 204. After the desired liquid has been extracted from the food and/or beverage, cover 111, shaft 110, and blending tool 112 are fully retracted and container 200 is removed from container chamber 101. Cover 111 and blending tool 112 may be removed from food blending and pressing apparatus 100 for cleaning.

Figure 18:
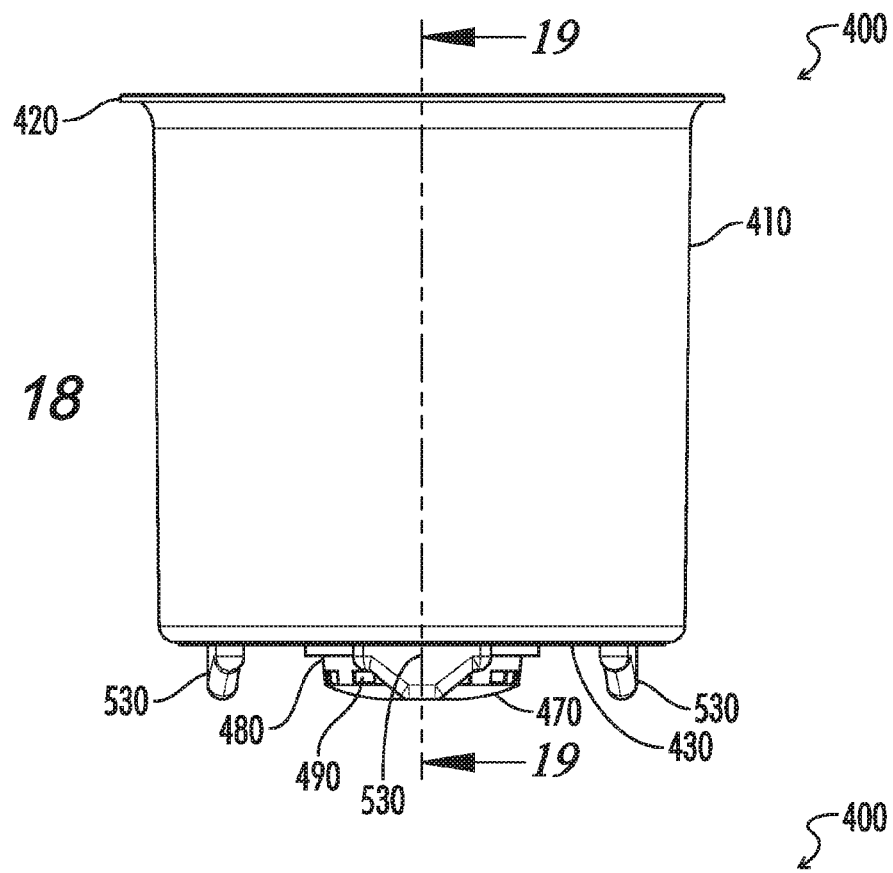
FIG. 18 is a side view of another embodiment of a container in accordance with the present disclosure.
Figure 19:
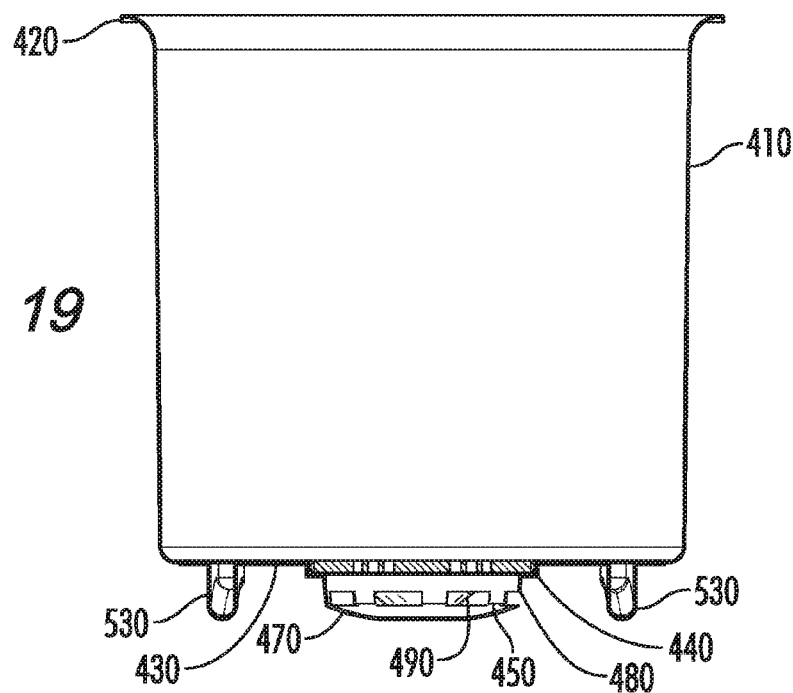
FIG. 19 is a cross sectional view of the container shown in FIG. 18.
Figure 20:
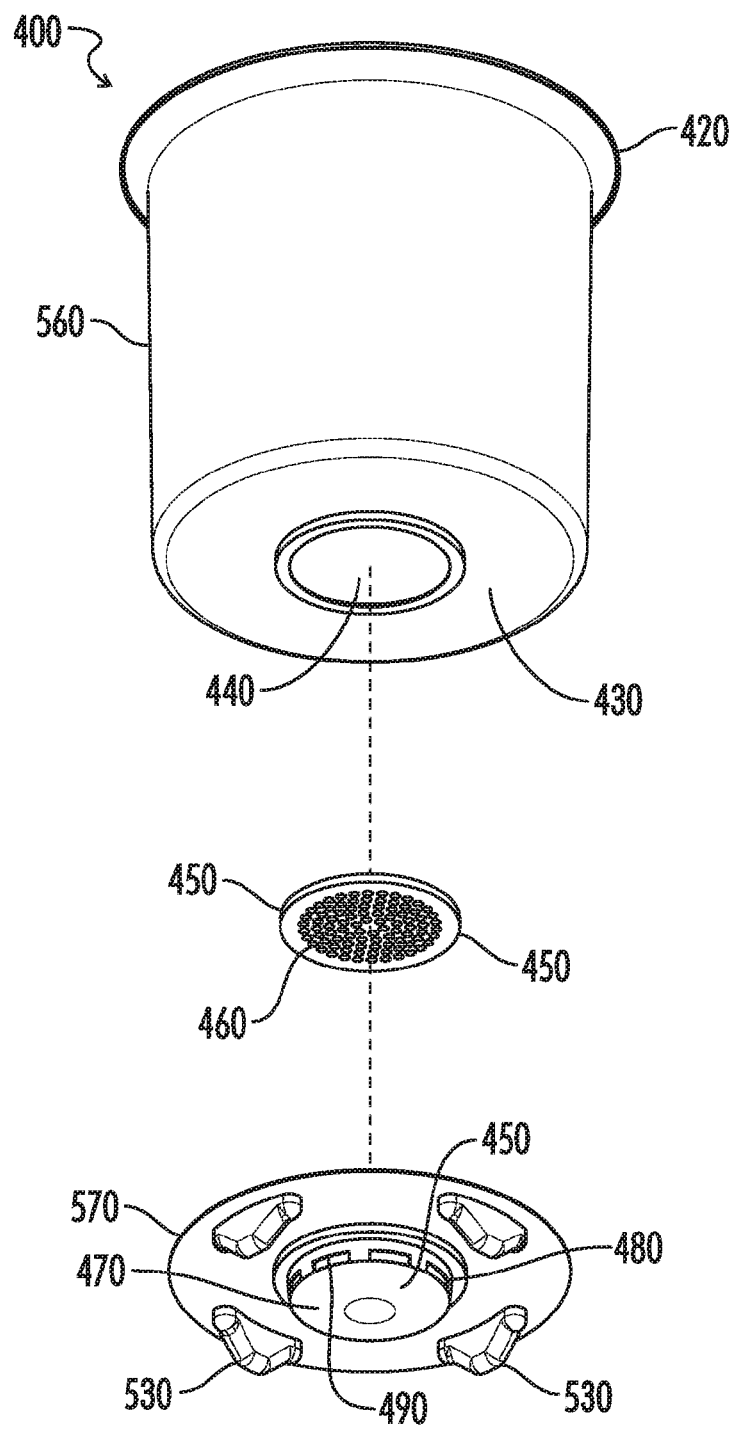
FIG. 20 is an exploded perspective view of the container shown in FIG. 18.
Figure 21:
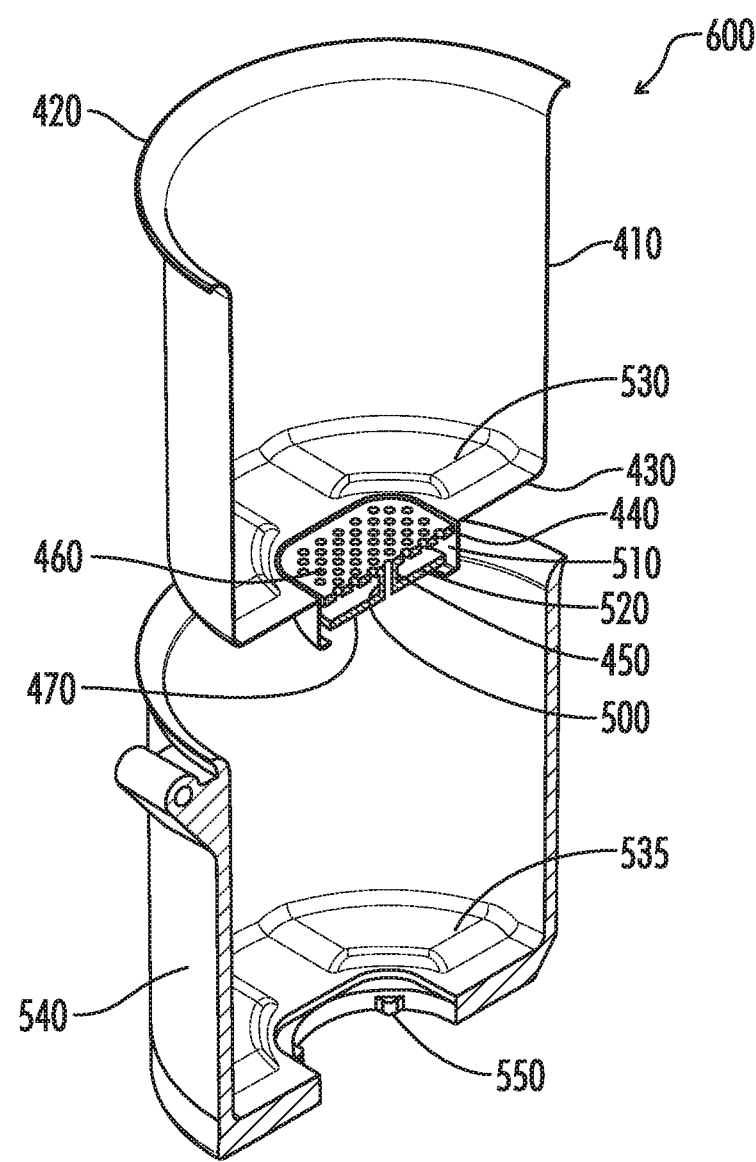
FIG. 21 is a sectioned view of another embodiment of a container in accordance with the present disclosure, the container shown with an outer container.

FIG. 18 is a side view of another embodiment of a container 400 in accordance with the present disclosure and FIG. 19 is a cross sectional view taken along line A-A of FIG. 18. FIG. 21 is an exploded view of the container 400 of FIG. 18 and FIG. 20 is an exploded perspective view of the container 400 shown in FIG. 18.

FIG. 21 is a sectioned view of another embodiment of a container 600 in accordance with the present disclosure, the container 600 shown with an outer container 610 with which it interfaces. The container 600 of FIG. 21 shares many characteristics with that of FIG. 18 and the two embodiments are described together.

The container 400, 600 is configured to operate in conjunction with a blending and pressing apparatus, and may contain produce prepared for blending. The container 400, 600 has a sidewall 410 with an upper edge 420 and a base 430. The base 430 has an opening 440 that allows fluid to escape from the container during use. In some embodiments, the sidewall 410 may be cylindrical and the upper edge 420 may form a funnel to provide some leeway in aligning the container with an external apparatus during use.

Filling the opening 440 in the base 430 is a filter 450 comprising a first plate 460 and a second plate 470. The first plate 460 contains a plurality of holes, acting to filter a fluid passing through the plate. The second plate 470 does not contain holes and is for retarding the flow of fluid passing through the first plate 460.

In the container 400 of FIG. 18, the first plate 460 of the filter 450 is connected to the second plate 470 by radial sidewall 480, the radial sidewall 480 having apertures 490 for allowing fluid to escape. Typically, when fluid passes through the first plate 460, it may be under pressure and may be traveling at a high velocity. The fluid then hits the second plate 470, which retards the flow of the fluid such that it passes through the apertures 490 and exits the container 400 at a lower velocity.

In some embodiments, rather than having apertures in radial sidewall 48, the second plate 470 is provided with apertures about its periphery. In such an embodiment, fluid flowing through the first plate 460 of the filter 450 hits the second plate 470 near its center, then spread to its periphery and escape the container 400.

In the container 600 of FIG. 21, the first plate 460 is connected to the second plate 470 by a central connector 500. In such an embodiment, the sidewall 510 of the filter 450 may extend past the level of the second plate 470, and the sidewall 510 may end in an overlapping surface 520 that, along with the second plate 470, acts as a baffle. Accordingly, when fluid passes through the first plate 460 at a high velocity, it hits the second plate 470, which retards the velocity. It then passes between the second plate 470 and the sidewalls 510 and around the overlapping surface 520 and out of the container 600. The second plate 470 may be shaped in order to improve flow of fluid during use. For example, the second plate 470, or another part of the container 400, 600 may form a concave surface to allow steady flow of juice and pulp through the filter and out of an outlet of a housing or outer container 540 during use.

The filter 450 also acts as a bearing surface in the event of incidental contact with a blending tool during use of the container 400, 600. In some embodiments, the filter 450 may further contain a valve for preventing fluid from passing through the filter until a threshold pressure level is applied. In such an embodiment, a cover is applied to container, sealing the container, and is then lowered into the container, raising the pressure on the valve as the contents of the container are blended.

The container 400, 600 further comprises at least one irregularity that functions as an anti-rotational surface 530 in its base 430. Such irregularity may take any number of shapes, such as a narrow tongue, or legs, as shown in the container 400 shown in FIG. 18 or a semicircular sweep provided at a different level than the rest of the base 430 as shown in the container 600 in FIG. 21. Typically, the anti-rotational surface 530 of the container 600 is complementary to a corresponding anti-rotational element or irregularity 535 in a housing or outer container 540 in which the container is placed, such that when container 600 is inserted in the outer container 540, container 600 is unable to rotate. The anti-rotational surface may also function as supports for the container 400, 600 when not in a housing or outer container 540, such as when being filled with food for processing. A plastic film (not shown) may be fixed to both the upper edge 420 of the container 400, 600, as well as the opening 440 in the base 430 of the container to prevent contamination prior to use.

In some embodiments, additional anti-rotational features are provided. As shown in the container 600 of FIG. 21 extensions 550 may be provided in an outer container 540 which may interface with corresponding notches in the container 600. Accordingly, the container 400, 600 may be constructed such that the filter acts to align the container 400, 600 properly with an outer container.

Typically, the container is constructed using three separate parts—a basic cup 560 with an opening 440 in the bottom, a bottom mount 570 that includes the anti-rotational features 530 and a filter 450. The three parts are sealed together during assembly. In some embodiments, a portion of the filter 405, namely the second plate 470 and the sidewall 510 may be formed as part of the bottom mount 570 and only the first plate 460 is applied separately. The container may be made of a disposable material, such as food grade plastic or cardboard, or portions of it may be made of a disposable material, such that the filter is disposable and the cup is not, or vice versa. In some embodiments, the container is made of a durable material, such as stainless steel, and the filter is removable, such as to ease cleaning.

Figure 22:
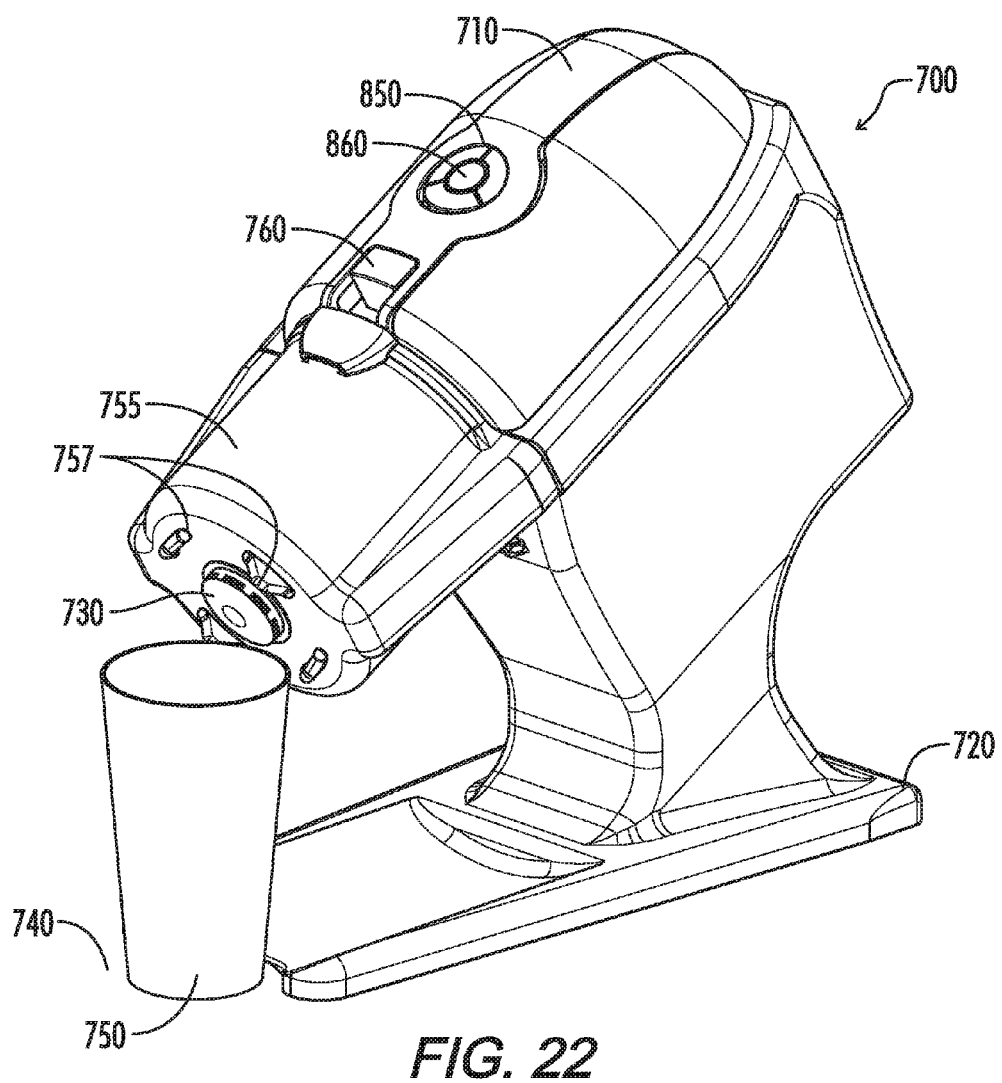
FIG. 22 is another embodiment of a food blending and pressing apparatus according to the disclosure configured to interface with the container shown in FIG. 18.
Figure 23:
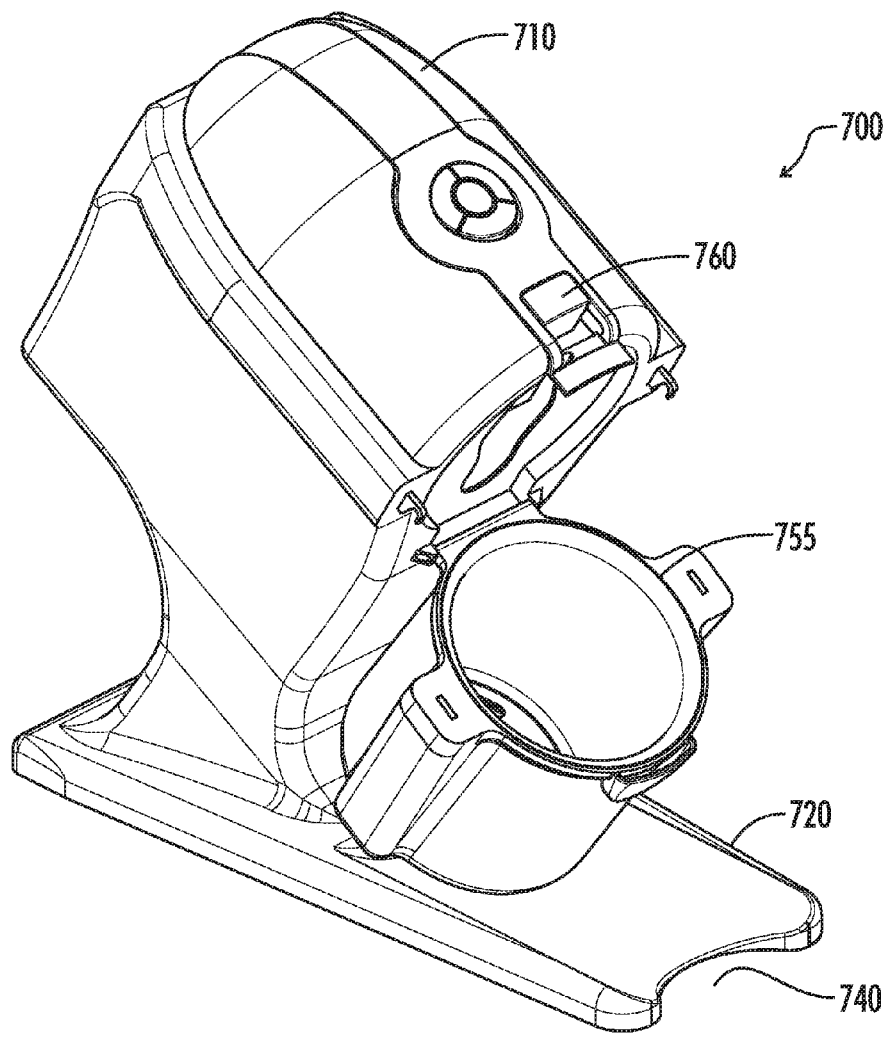
FIG. 23 is a view of the food blending and pressing apparatus of FIG. 22 shown in an open position.

FIG. 22 is another embodiment of a food blending and pressing apparatus 700 according to the disclosure configured to interface with the container 400 shown in FIG. 18. FIG. 23 shows the apparatus 700 of FIG. 22 shown in an open position.

Figure 24A:
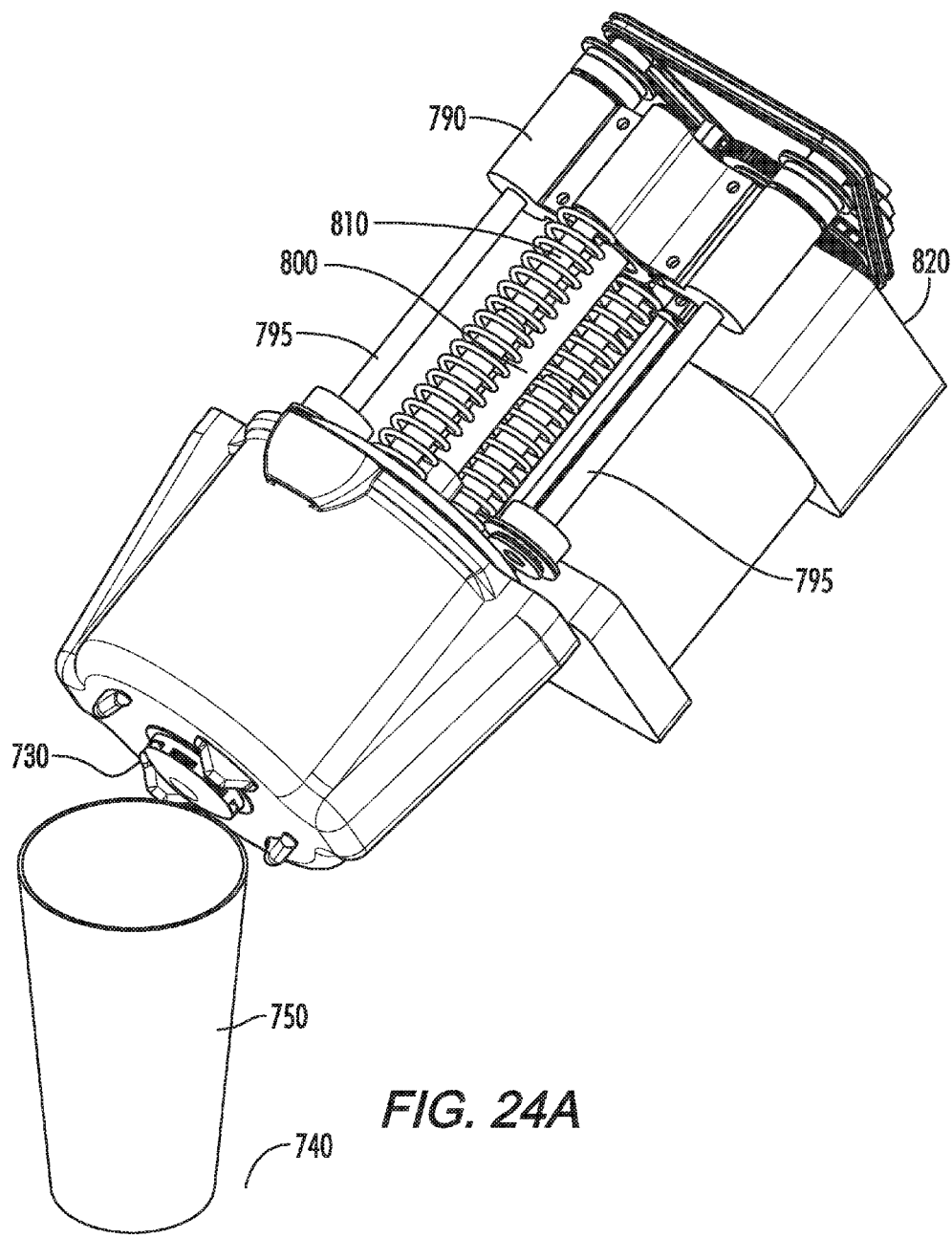
FIGS. 24A-B are views of the food blending and pressing apparatus of FIG. 22 with the housing removed in first and second positions.
Figure 24B:
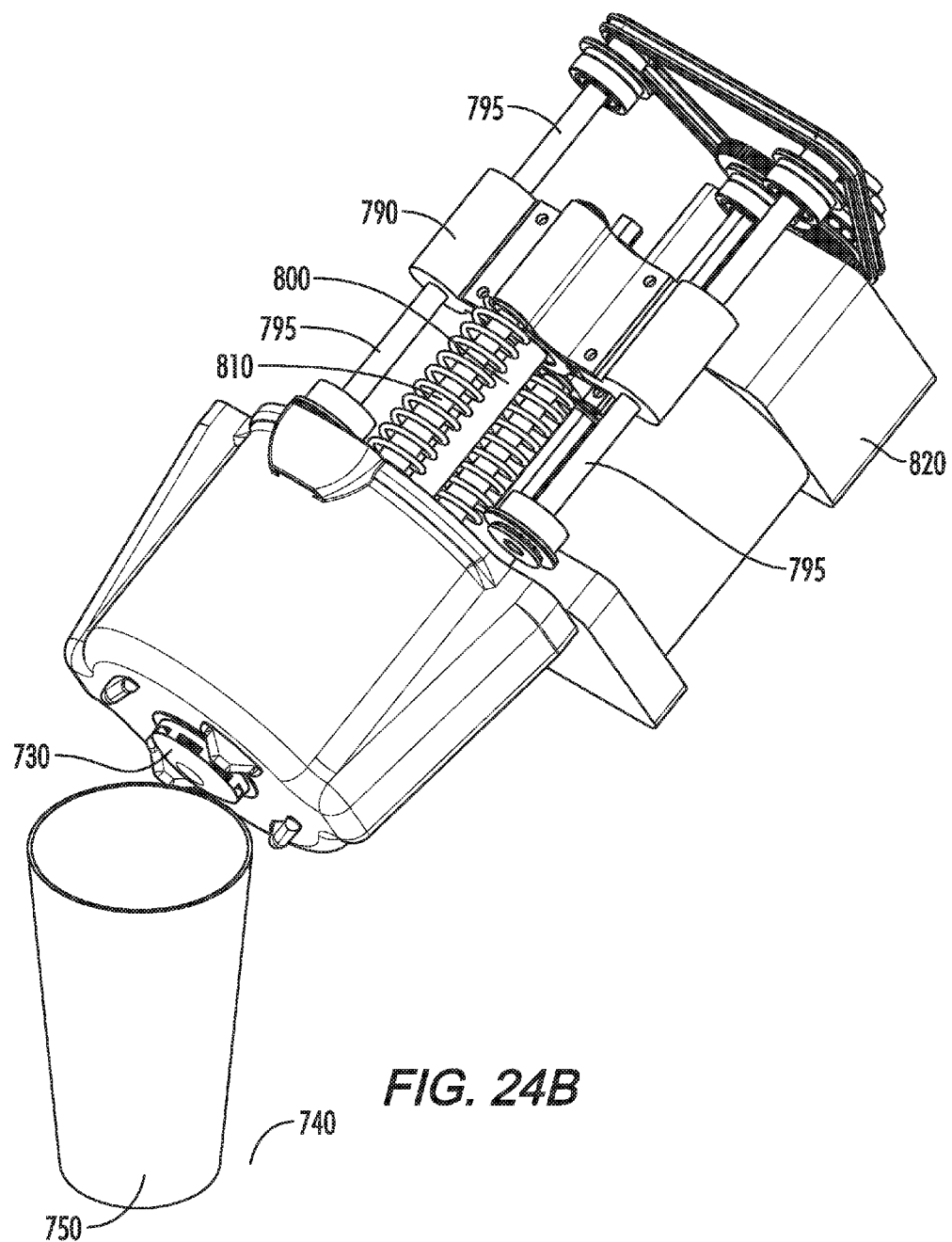
Figure 25:
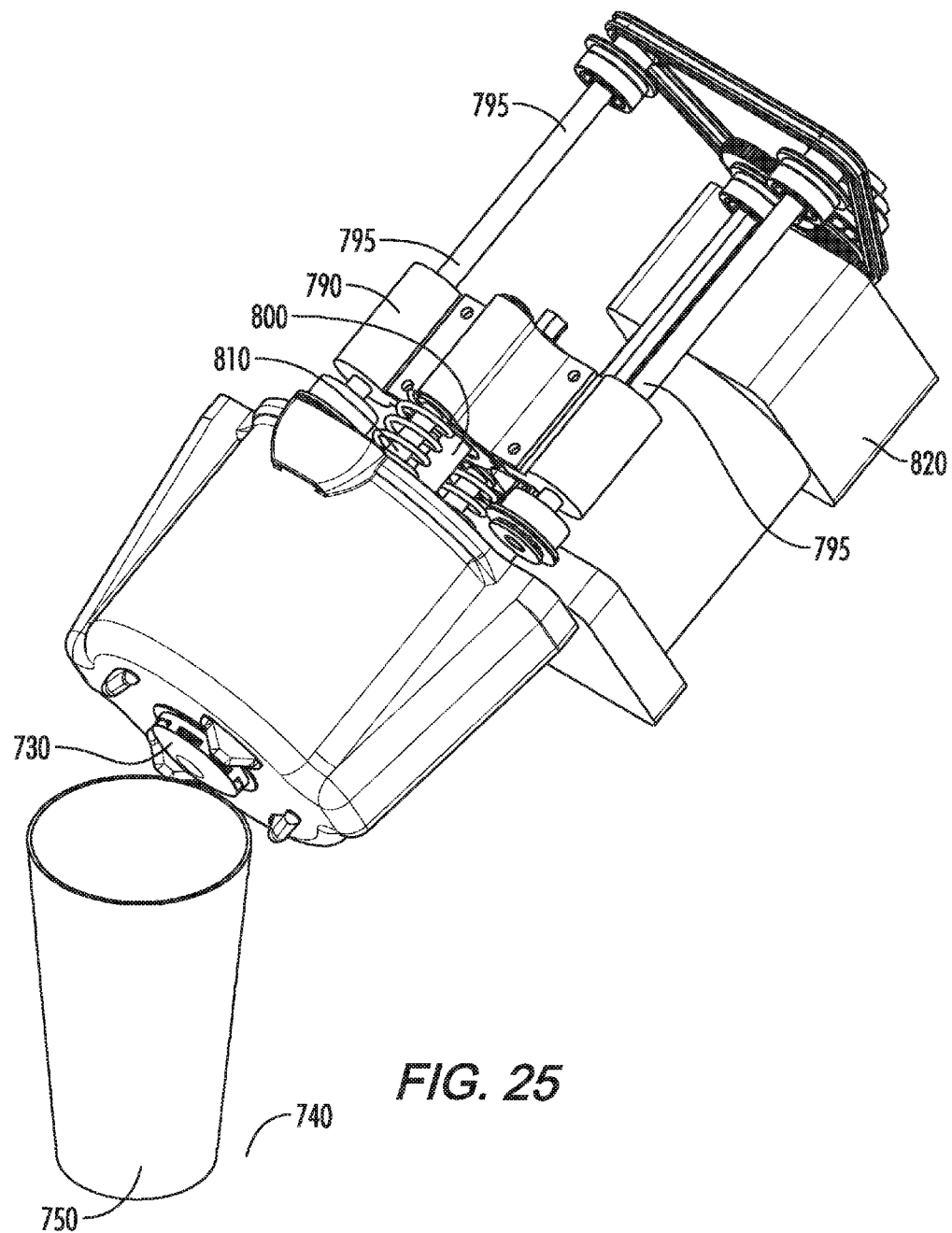
FIG. 25 is a view of the food blending and pressing apparatus of FIG. 22 with the housing removed in a third position.
Figure 26:
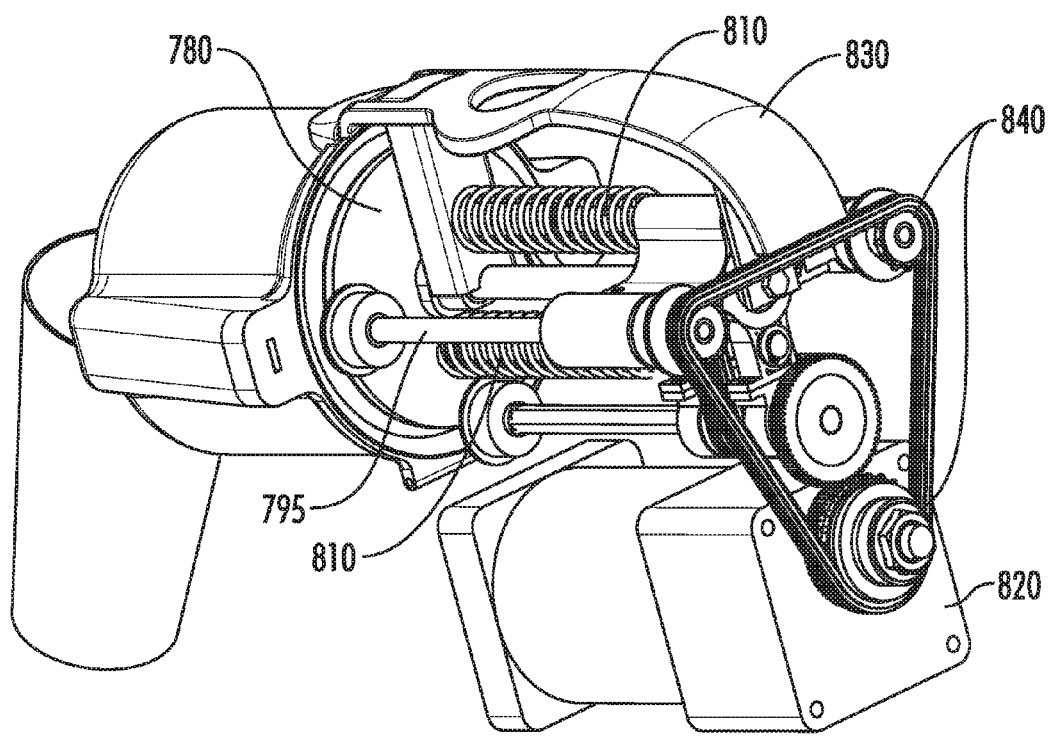
FIG. 26 is a view of the food blending and pressing apparatus of FIG. 22 with the housing and additional components removed.

FIGS. 24A-B are views of the food blending and pressing apparatus 700 of FIG. 22 with the housing 710 removed showing some internal components of the apparatus in a first position, fully extended, and in a second position, partially compressed, respectively. FIG. 25 shows it in a third position, fully compressed. FIG. 26 is a view of the food blending and pressing apparatus of FIG. 22 with the housing and additional components removed.

The blending and pressing apparatus 700 of FIGS. 22-26 operates in a similar manner to that discussed above with respect to FIGS. 1-10. Accordingly, the description provided herein will focus on distinctions between the embodiments, and portions of the description will be duplicative. As shown, the entire apparatus 700 is angled relative to that shown in FIG. 1 and is provided with a base 720 integrated into the housing 710 Accordingly, an outlet 730 for juice pressed using the apparatus 700 is suspended above a serving area 740. As shown, a cup 750 may be provided within the serving area to receive juice from the outlet 730. Angling the apparatus 700 as shown allows for the provision of an outlet 730 at a reasonable height for filling a cup 750 while reducing the overall height of the apparatus 700.

As shown, the bottom portion 755 of the housing 710, which hinges downwards to open the housing 710, functions to hold the container 400 of FIG. 18. Accordingly, the bottom portion 755 of the housing 710 has anti-rotational surfaces 757 that correspond to the anti-rotational surfaces 530 of the container 400.

The housing further comprises a first lever 760 for opening the housing 710, as shown in FIG. 23, such as for inserting and removing a container 400, 600 containing produce, such as those described above.

FIGS. 24A-B and 25 show the apparatus 700 with its housing 710 removed with internal mechanisms in different positions. Typically a blending tool (not shown) is rotated by a driving source 820 and blends food and/or beverage in a container 400, 600 to a desired consistency while a cover 780 hermetically seals the container 400, 600 during the blending process. A primary elevator 790 assembly is used to raise and lower a shaft 800 attached to the blending tool during the blending process. The primary elevator 790 is preferably driven by two synchronous lead screws 795, but may be actuated in any number of ways. A secondary elevator assembly (not shown), typically an interface between a force applicator, such as springs, and the cover 780, is used to raise and lower the cover with respect to the primary elevator during the blending and pressing. The secondary elevator is preferably driven by two springs 810 and provides continuous downward force on the cover 780. The use of springs allows the distance between the blade and the cover 780 to vary based on the amount of contents in the container. However, a variety of alternative mechanisms are contemplated as well.

The cover 780 is used to continuously press the food and/or beverage towards the bottom of the container 400, 600, causing liquid to flow through the filter 450 of the container 400, 600 and out the outlet 730 in the housing 710. The shaft 800 is preferably connected to a driving source 820, such as a motor, for rotating the blending tool, as well as to the primary elevator 790 by quick release connectors for quick removal and cleaning. A second lever 830, accessible outside of the housing, is used to disengage the quick release connector for the shaft 800. The cover 780 is preferably connected to the secondary elevator by a quick release connector for quick removal and cleaning.

By way of the second lever 830, many of the internal components of the apparatus 700 may be removed from the housing, allowing for easy cleaning of those components. Typically, the second lever may be locked, or may not be accessible, unless the apparatus is in the open position, as shown in FIG. 23.

A single gear motor acts as a driving source 820 and drives both the primary elevator and rotation of the shaft. The speed of the motor may be variable, and in some embodiments is typically 80 RPM, thereby providing significant torque to the shaft. Such torque may be necessary for slow-juice extraction, and may also be used to provide an optimal speed for the reciprocating movement of the lead screws 795. Two hard stops (fully retracted and fully extended) are used to limit the overall stroke of the primary elevator 790. A torque limiter 840 is used to couple the gear motor 820 to the lead screws 795, allowing for both safe operation and the shaft to rotate infinitely during operation in the event the torque limiter 840 disengages. The torque limiter 840 may be a friction based clutch that releases if a threshold torque is reached. The threshold torque may be used to limit the total force allowed in the system, and the torque limiter may further include limiters to prevent the blade from moving beyond the top or bottom of the container 400, 600.

The apparatus 700 may provide multiple options for juice extraction, which a user may select using a controller 850. Prior to pressing the start button 860, the amount of pulp extruded with the juice can be dynamically and automatically adjusted. Typically, there may be 3 options: Minimum, Medium, and Maximum pulp. Software provided with the apparatus 700 then modifies the blending and pressing sequence based on the option selected. The more pulp desired, the longer amount of time the blade will spin at the bottom of the container 400, 600, thereby extruding more pulp through the filter. The software typically moves the primary elevator 790 as follows:

a. Extend the blending tool down until the stroke is fully extended;
b. Cycle 3 times: retract the blending tool for 5 seconds, then fully extend again; and
c. Retract fully for removal and cleaning Although the present disclosure has been described in considerable detail with reference to certain preferred versions thereof, other versions are possible. Therefore, the spirit and scope of the appended claims should not be limited to the description of the preferred versions contained therein. Any element in a claim that does not explicitly state "means for" performing a specified function, or "step for" performing a specified function, is not to be interpreted as a "means" or "step" clause as specified in 35 U.S.C. §112, ¶6. In particular, the use of "step of" in the claims is not intended to invoke the provisions of 35 U.S.C. §112, ¶6.

The reader's attention is directed to all papers and documents which are filed concurrently with his specification and which are open to public inspection with this specification, and the contents of all such papers and documents are incorporated herein by reference. All features disclosed in this specification (including any accompanying claims, abstract, and drawings) may be replaced by alternative features serving the same, equivalent or similar purpose, unless expressly stated otherwise. Unless expressly stated otherwise, each feature disclosed is one example only of a generic series of equivalent or similar features.

What is claimed is:

1. A food blending and pressing apparatus comprising:
   a container having an upper opening, a base, and an outlet extending through a bottom;
   a cover hermetically sealing the upper opening;
   a shaft extending through the cover, a blending tool fixed to an end of the shaft;
   a primary elevator controlling a vertical position of the shaft; and
   a secondary elevator controlling a vertical position of the cover,
   wherein the outlet further comprises a filter.

2. The apparatus of claim 1 wherein the filter comprises a first plate having a plurality of apertures configured to filter a fluid and a second plate configured to retard the flow of the fluid through the filter.

3. The apparatus of claim 2 wherein the filter further comprises a valve configured to prevent the fluid from passing through the filter until a threshold pressure level is applied.

4. The apparatus of claim 2 wherein the filter further comprises a sidewall between the first plate and the second plate, the side wall comprising at least one aperture configured to allow fluid to escape an interior.

5. The apparatus of claim 1 further comprising a housing configured to the container, and wherein the container is removable.

6. The apparatus of claim 1, the base further comprising at least one irregularity configured to interface with a corresponding irregularity in the housing.

* * * * *